United States Patent
Su et al.

(10) Patent No.: US 11,734,740 B2
(45) Date of Patent: *Aug. 22, 2023

(54) GARMENT SIZE MAPPING

(71) Applicant: eBay Inc., San Jose, CA (US)

(72) Inventors: Jonathan Su, San Jose, CA (US);
Mihir Naware, Redwood City, CA (US); Jatin Chhugani, Santa Clara, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/331,027

(22) Filed: May 26, 2021

(65) Prior Publication Data

US 2021/0279783 A1 Sep. 9, 2021

Related U.S. Application Data

(63) Continuation of application No. 16/167,867, filed on Oct. 23, 2018, now Pat. No. 11,055,758, which is a
(Continued)

(51) Int. Cl.
*G06Q 30/06* (2023.01)
*G06Q 30/0601* (2023.01)

(52) U.S. Cl.
CPC ..... *G06Q 30/0621* (2013.01); *G06Q 30/0643* (2013.01)

(58) Field of Classification Search
CPC .......... G06Q 30/0621; G06Q 30/0643
(Continued)

(56) References Cited

U.S. PATENT DOCUMENTS 3,823,308 A 7/1974 Goldberg
3,852,571 A 12/1974 Hall et al.
(Continued)

FOREIGN PATENT DOCUMENTS

AU 199928111 A1 1/2000
AU 200197079 A1 6/2002
(Continued)

OTHER PUBLICATIONS

Tisch, Carol , "Custom everything: the new benchmark in luxury is individually created goods. Here are some of Sarasota's finest"; Sarasota Magazine31.11: 64(8). Clubhouse Publishing, Inc. (Aug. 2009) retrieved from Dialog on Dec. 5, 2022 (Year: 2009).*
(Continued)

*Primary Examiner* — Yogesh C Garg
(74) *Attorney, Agent, or Firm* — Holland & Hart LLP

(57) ABSTRACT

Techniques for mapping size information associated with a client to target brands, garments, sizes, shapes, and styles for which there is no standardized correlation. The size information associated with a client may be generated by modeling client garments, accessing computer aided drawing (CAD) files associated with client garments, or by analyzing a history of garment purchases associated with the client. Information for target garments may be generated in a similar fashion. A system may then create a standardized scale with a set of sizes for a target, and map a client base size to that standardized size scale. Similar matching and mapping may also be done with shape and style considerations. A recommendation based on the mapping may then be communicated to the client.

37 Claims, 10 Drawing Sheets

Related U.S. Application Data continuation of application No. 14/503,309, filed on Sep. 30, 2014, now abandoned.

(58) Field of Classification Search
USPC ............................................. 705/26.5
See application file for complete search history.

(56) References Cited

U.S. PATENT DOCUMENTS

| | | |
|---|---|---|
| 3,896,266 A | 7/1975 | Waterbury |
| 4,471,216 A | 9/1984 | Herve |
| 5,053,606 A | 10/1991 | Kimizu |
| 5,255,352 A | 10/1993 | Falk |
| 5,416,306 A | 5/1995 | Imahata |
| 5,495,568 A | 2/1996 | Beavin |
| 5,532,464 A | 7/1996 | Josephson et al. |
| 5,679,938 A | 10/1997 | Templeton et al. |
| 5,708,422 A | 1/1998 | Blonder et al. |
| 5,750,972 A | 5/1998 | Botvin |
| 5,770,843 A | 6/1998 | Rose et al. |
| 5,718,178 A | 7/1998 | Smith |
| 5,778,178 A | 7/1998 | Arunachalam |
| 5,793,028 A | 8/1998 | Wagener et al. |
| 5,817,482 A | 10/1998 | Bandman et al. |
| 5,870,456 A | 2/1999 | Rogers |
| 5,877,482 A | 3/1999 | Reilly |
| 5,883,810 A | 3/1999 | Franklin et al. |
| 5,903,878 A | 5/1999 | Talati et al. |
| 5,907,801 A | 5/1999 | Albert et al. |
| 5,907,832 A | 5/1999 | Pieterse et al. |
| 5,930,769 A | 7/1999 | Rose |
| 5,963,917 A | 10/1999 | Ogram |
| 5,987,500 A | 11/1999 | Arunachalam |
| 6,029,150 A | 2/2000 | Kravitz |
| 6,052,675 A | 4/2000 | Checchio |
| 6,175,655 B1 | 1/2001 | George, III et al. |
| 6,212,556 B1 | 4/2001 | Arunachalam |
| 6,226,624 B1 | 5/2001 | Watson et al. |
| 6,266,649 B1 | 7/2001 | Linden et al. |
| 6,310,627 B1 | 10/2001 | Sakaguchi |
| 6,415,199 B1 | 7/2002 | Liebermann et al. |
| 6,490,534 B1 | 12/2002 | Pfister |
| 6,497,359 B1 | 12/2002 | Chihara |
| 6,546,309 B1 | 4/2003 | Gazzuolo |
| 6,643,385 B1 | 11/2003 | Bravomalo |
| 6,813,838 B2 | 11/2004 | McCormick |
| 6,836,765 B1 | 12/2004 | Sussman |
| 7,242,999 B2 | 7/2007 | Wang |
| 7,308,332 B2 | 12/2007 | Okada et al. |
| 7,328,119 B1 | 2/2008 | Pryor et al. |
| 7,354,411 B2 | 4/2008 | Perry et al. |
| 7,398,133 B2 | 7/2008 | Wannier et al. |
| 7,430,537 B2 | 9/2008 | Templeton et al. |
| 7,436,976 B2 | 10/2008 | Levy et al. |
| 7,548,794 B2 | 6/2009 | Vandergriff et al. |
| 7,574,653 B2 | 8/2009 | Croney et al. |
| 7,647,041 B2 | 1/2010 | Gonsalves et al. |
| 7,663,648 B1 | 2/2010 | Saldanha et al. |
| 7,714,912 B2 | 5/2010 | Faisman et al. |
| 3,024,260 A1 | 9/2011 | Hogl et al. |
| 3,032,943 A1 | 10/2011 | Demello et al. |
| 8,073,740 B1 | 12/2011 | Siegel et al. |
| 8,090,465 B2 | 1/2012 | Zeng |
| 8,269,778 B1 | 9/2012 | Baraff et al. |
| 8,359,247 B2 | 1/2013 | Vock |
| 8,525,828 B1 | 9/2013 | Bates |
| 8,655,053 B1 | 2/2014 | Hansen |
| 8,659,596 B2 | 2/2014 | Corazza et al. |
| 8,704,832 B2 | 4/2014 | Taylor et al. |
| 8,711,175 B2 | 4/2014 | Aarabi |
| 8,736,606 B2 | 5/2014 | Ramalingam |
| 8,738,292 B1 | 5/2014 | Faaborg et al. |
| 8,749,556 B2 | 6/2014 | De Aguiar et al. |
| 8,797,328 B2 | 8/2014 | Corazza et al. |
| 8,855,375 B2 | 10/2014 | Macciola et al. |
| 8,935,611 B2 | 1/2015 | Oberbrunner et al. |
| 8,970,585 B2 | 3/2015 | Weaver |
| 9,098,813 B1 | 8/2015 | Konig et al. |
| 9,098,873 B2 | 8/2015 | Geisner et al. |
| 9,176,989 B2 | 11/2015 | Deng et al. |
| 9,241,184 B2 | 1/2016 | Weerasinghe |
| 9,378,593 B2 | 6/2016 | Chhugani et al. |
| 9,420,319 B1 | 8/2016 | Story et al. |
| 9,460,342 B1 | 10/2016 | Freund et al. |
| 9,465,572 B2 | 10/2016 | Yamat et al. |
| 9,691,161 B1 | 6/2017 | Yalniz et al. |
| 9,717,982 B2 | 8/2017 | Quinn et al. |
| 9,905,019 B2 | 2/2018 | Applegate et al. |
| 9,923,622 B2 | 3/2018 | Jactat et al. |
| 9,940,749 B2 | 4/2018 | Chen et al. |
| 9,953,460 B2 | 4/2018 | Su et al. |
| 10,068,371 B2 | 9/2018 | Su et al. |
| 10,089,680 B2 | 10/2018 | Lin et al. |
| 10,176,515 B2 | 1/2019 | Lutnick et al. |
| 10,366,439 B2 | 7/2019 | Leonard et al. |
| 10,410,414 B2 | 9/2019 | Jonathan et al. |
| 11,055,758 B2 | 7/2021 | Su et al. |
| 11,100,564 B2 | 8/2021 | Leonard et al. |
| 11,145,118 B2 | 10/2021 | Su et al. |
| 2001/0023417 A1 | 9/2001 | Stefik et al. |
| 2001/0026272 A1 | 10/2001 | Feld et al. |
| 2002/0004763 A1* | 1/2002 | Lam ................ G06Q 30/0631 |
| | | 705/26.7 |
| 2002/0035793 A1 | 3/2002 | Byrd |
| 2002/0077837 A1 | 6/2002 | Krueger et al. |
| 2002/0095384 A1 | 7/2002 | Pestoni et al. |
| 2002/0126328 A1 | 9/2002 | Lehmeier et al. |
| 2002/0174360 A1 | 11/2002 | Ikeda |
| 2003/0101105 A1 | 5/2003 | Vock |
| 2003/0139896 A1 | 7/2003 | Dietz et al. |
| 2003/0152272 A1 | 8/2003 | Venable |
| 2004/0049309 A1 | 3/2004 | Gardner et al. |
| 2004/0083142 A1 | 4/2004 | Kozzinn |
| 2004/0127277 A1 | 7/2004 | Walker et al. |
| 2005/0289081 A1 | 12/2005 | Sporny |
| 2006/0020482 A1 | 1/2006 | Coulter |
| 2006/0059054 A1 | 3/2006 | Adiseshan |
| 2006/0202986 A1 | 9/2006 | Okada et al. |
| 2007/0005174 A1 | 1/2007 | Thomas |
| 2007/0124215 A1 | 5/2007 | Simmons, Jr. |
| 2007/0182736 A1 | 8/2007 | Weaver |
| 2007/0199076 A1 | 8/2007 | Rensin et al. |
| 2007/0223704 A1 | 9/2007 | Brickell et al. |
| 2007/0232272 A1 | 10/2007 | Gonsalves et al. |
| 2007/0250203 A1 | 10/2007 | Yamamoto et al. |
| 2008/0022086 A1 | 1/2008 | Ho et al. |
| 2008/0140650 A1 | 6/2008 | Stackpole |
| 2008/0163344 A1 | 7/2008 | Yang |
| 2008/0201228 A1 | 8/2008 | Gillet et al. |
| 2008/0201638 A1 | 8/2008 | Nair |
| 2008/0221403 A1 | 9/2008 | Fernandez |
| 2008/0243386 A1 | 10/2008 | Kumar et al. |
| 2008/0312765 A1 | 12/2008 | Gardiner et al. |
| 2008/0312998 A1 | 12/2008 | Templeton et al. |
| 2009/0002224 A1 | 1/2009 | Khatib et al. |
| 2009/0018803 A1 | 1/2009 | Ko et al. |
| 2009/0029337 A1 | 1/2009 | Nasci et al. |
| 2009/0115777 A1 | 5/2009 | Reyers et al. |
| 2009/0144639 A1 | 6/2009 | Nims et al. |
| 2009/0193675 A1 | 8/2009 | Sieber |
| 2009/0222127 A1 | 9/2009 | Lind |
| 2009/0248537 A1 | 10/2009 | Sarkeshik |
| 2009/0249537 A1 | 10/2009 | Jensen |
| 2009/0276300 A1 | 11/2009 | Shaw et al. |
| 2009/0287452 A1 | 11/2009 | Stanley et al. |
| 2009/0293116 A1 | 11/2009 | Demello et al. |
| 2010/0030578 A1 | 2/2010 | Siddique et al. |
| 2010/0049633 A1 | 2/2010 | Wannier et al. |
| 2010/0076819 A1 | 3/2010 | Wannier et al. |
| 2010/0082360 A1 | 4/2010 | Chien et al. |
| 2010/0097395 A1 | 4/2010 | Chang et al. |
| 2010/0191770 A1 | 7/2010 | Cho et al. |
| 2010/0280920 A1 | 11/2010 | Scott et al. |
| 2010/0305909 A1 | 12/2010 | Wolper et al. |

(56) References Cited

U.S. PATENT DOCUMENTS

| | | |
|---|---|---|
| 2010/0306082 A1 | 12/2010 | Wolper et al. |
| 2010/0313141 A1 | 12/2010 | Yu et al. |
| 2010/0332567 A1 | 12/2010 | Samadani |
| 2011/0022372 A1 | 1/2011 | Isogai et al. |
| 2011/0022965 A1 | 1/2011 | Lawrence et al. |
| 2011/0063208 A1 | 3/2011 | Van Den Eerenbeemd et al. |
| 2011/0099122 A1 | 4/2011 | Bright et al. |
| 2011/0145093 A1 | 6/2011 | Paradise et al. |
| 2011/0184831 A1 | 7/2011 | Dalgleish |
| 2011/0191070 A1 | 8/2011 | Ramalingam |
| 2011/0231278 A1 | 9/2011 | Fries |
| 2011/0238541 A1 | 9/2011 | Challener et al. |
| 2011/0292034 A1 | 12/2011 | Corazza et al. |
| 2011/0298897 A1 | 12/2011 | Sareen et al. |
| 2012/0030060 A1 | 2/2012 | Lu et al. |
| 2012/0030062 A1 | 2/2012 | Stauffer et al. |
| 2012/0054059 A1 | 3/2012 | Rele |
| 2012/0078145 A1 | 3/2012 | Malhi et al. |
| 2012/0095589 A1 | 4/2012 | Vapnik |
| 2012/0233003 A1 | 9/2012 | Calman et al. |
| 2012/0259720 A1 | 10/2012 | Nuzzi |
| 2012/0281019 A1 | 11/2012 | Tamstorf et al. |
| 2012/0299912 A1 | 11/2012 | Kapur et al. |
| 2012/0308087 A1 | 12/2012 | Chao et al. |
| 2012/0309520 A1 | 12/2012 | Evertt et al. |
| 2012/0310791 A1 | 12/2012 | Weerasinghe |
| 2013/0024301 A1 | 1/2013 | Mikan et al. |
| 2013/0071584 A1 | 3/2013 | Bell |
| 2013/0108121 A1 | 5/2013 | de Jong |
| 2013/0110482 A1 | 5/2013 | Ellens et al. |
| 2013/0173226 A1 | 7/2013 | Reed et al. |
| 2013/0215113 A1 | 8/2013 | Corazza et al. |
| 2013/0215116 A1 * | 8/2013 | Siddique ............... G06Q 20/40 705/26.7 |
| 2013/0246222 A1 | 9/2013 | Weerasinghe |
| 2013/0254025 A1 | 9/2013 | Liu et al. |
| 2013/0258045 A1 | 10/2013 | Wojciech |
| 2013/0268399 A1 | 10/2013 | Lu et al. |
| 2013/0317944 A1 | 11/2013 | Huang et al. |
| 2014/0035913 A1 | 2/2014 | Higgins et al. |
| 2014/0040041 A1 | 2/2014 | Ohnemus et al. |
| 2014/0095348 A1 | 4/2014 | Goulart |
| 2014/0114620 A1 | 4/2014 | Grinspun et al. |
| 2014/0114884 A1 | 4/2014 | Daway |
| 2014/0129381 A1 | 5/2014 | Fries |
| 2014/0139390 A1 | 5/2014 | Mauge et al. |
| 2014/0164902 A1 | 6/2014 | Sager |
| 2014/0176565 A1 | 6/2014 | Adeyoola et al. |
| 2014/0180864 A1 | 6/2014 | Orlov et al. |
| 2014/0236703 A1 | 8/2014 | Nordstrand et al. |
| 2014/0236753 A1 | 8/2014 | Abhyanker |
| 2014/0257993 A1 | 9/2014 | Paolini |
| 2014/0258032 A1 * | 9/2014 | Psota ............... G06Q 30/0609 705/26.35 |
| 2014/0267717 A1 | 9/2014 | Pitzer et al. |
| 2014/0270540 A1 | 9/2014 | Spector et al. |
| 2014/0279200 A1 | 9/2014 | Hosein et al. |
| 2014/0279289 A1 | 9/2014 | Steermann |
| 2014/0282721 A1 | 9/2014 | Kuncl et al. |
| 2014/0313192 A1 | 10/2014 | Corazza et al. |
| 2014/0333614 A1 | 11/2014 | Black et al. |
| 2014/0368499 A1 | 12/2014 | Kaur |
| 2015/0032531 A1 | 1/2015 | Yankovich et al. |
| 2015/0130795 A1 | 5/2015 | Chhugani et al. |
| 2015/0134302 A1 | 5/2015 | Chhugani et al. |
| 2015/0134493 A1 | 5/2015 | Su et al. |
| 2015/0134494 A1 | 5/2015 | Su et al. |
| 2015/0134495 A1 | 5/2015 | Naware et al. |
| 2015/0134496 A1 | 5/2015 | Grinblat et al. |
| 2015/0154691 A1 | 6/2015 | Curry et al. |
| 2015/0186977 A1 | 7/2015 | Leonard et al. |
| 2015/0366504 A1 | 12/2015 | Connor |
| 2016/0029706 A1 | 2/2016 | Braverman |
| 2016/0035061 A1 | 2/2016 | Gadre et al. |
| 2016/0063588 A1 | 3/2016 | Gadre et al. |
| 2016/0088284 A1 | 3/2016 | Sareen et al. |
| 2016/0092956 A1 | 3/2016 | Su et al. |
| 2016/0117749 A1 | 4/2016 | Desmarais et al. |
| 2016/0155186 A1 | 6/2016 | Su et al. |
| 2016/0165988 A1 | 6/2016 | Glasgow et al. |
| 2016/0165989 A1 | 6/2016 | Glasgow et al. |
| 2016/0171583 A1 | 6/2016 | Glasgow et al. |
| 2016/0180447 A1 | 6/2016 | Kamalie et al. |
| 2016/0180449 A1 | 6/2016 | Naware et al. |
| 2016/0180562 A1 | 6/2016 | Naware et al. |
| 2016/0210602 A1 | 7/2016 | Siddique et al. |
| 2016/0239889 A1 | 8/2016 | Nuzzi |
| 2016/0247017 A1 | 8/2016 | Sareen et al. |
| 2016/0249699 A1 | 9/2016 | Inghirami |
| 2016/0292779 A1 | 10/2016 | Rose et al. |
| 2016/0292915 A1 | 10/2016 | Chhugani et al. |
| 2017/0004567 A1 | 1/2017 | Dutt et al. |
| 2017/0161948 A1 | 6/2017 | Hua et al. |
| 2018/0197331 A1 | 7/2018 | Chen et al. |
| 2018/0350140 A1 | 12/2018 | Su et al. |
| 2019/0057428 A1 | 2/2019 | Su et al. |
| 2019/0130649 A1 | 5/2019 | O'brien et al. |
| 2019/0295147 A1 | 9/2019 | Leonard et al. |
| 2020/0090402 A1 | 3/2020 | Su et al. |

FOREIGN PATENT DOCUMENTS

| | | | |
|---|---|---|---|
| AU | 2001271968 B2 | 3/2007 | |
| AU | 2012240481 B2 | 8/2015 | |
| AU | 2015255283 B2 | 4/2017 | |
| CN | 102842089 A | 12/2012 | |
| CN | 103455501 A | 12/2013 | |
| CN | 103605832 A | 2/2014 | |
| DE | 4425271 A1 | 1/1996 | |
| DE | 19628045 A1 | 1/1998 | |
| DE | 19634418 A1 | 3/1998 | |
| DE | 19922150 A1 | 11/2000 | |
| DE | 19926472 A1 | 12/2000 | |
| DE | 10022973 A1 | 2/2001 | |
| DE | 60014743 T2 * | 10/2005 | ......... G10L 15/1822 |
| EP | 0519843 A3 | 12/1992 | |
| EP | 0527639 A2 | 2/1993 | |
| EP | 0216521 B1 | 11/1993 | |
| EP | 0693742 A2 | 1/1996 | |
| EP | 0400911 B1 | 11/1996 | |
| EP | 0848360 A1 | 6/1998 | |
| EP | 1192611 A | 4/2002 | |
| EP | 2091015 A1 | 8/2009 | |
| EP | 2187325 A1 | 5/2010 | |
| IT | 2012A000628 A1 | 5/2014 | |
| JP | 2004519748 A | 7/2004 | |
| JP | 2008257747 A | 10/2008 | |
| JP | 2010124604 A | 6/2010 | |
| KR | 10-2003-0097465 A | 12/2003 | |
| KR | 10-2010-0015465 A | 2/2010 | |
| KR | 10-2010-0053646 A | 5/2010 | |
| KR | 10-2010-0058356 A | 6/2010 | |
| KR | 10-1606623 B1 | 3/2016 | |
| KR | 10-1775855 B1 | 9/2017 | |
| WO | 95/06294 A1 | 3/1995 | |
| WO | 95/16971 A1 | 6/1995 | |
| WO | 96/38813 A1 | 12/1996 | |
| WO | 97/10560 A1 | 3/1997 | |
| WO | 97/13228 A1 | 4/1997 | |
| WO | 99/08242 A1 | 2/1999 | |
| WO | 99/23622 A1 | 5/1999 | |
| WO | 99/66436 A1 | 12/1999 | |
| WO | 00/77754 A1 | 12/2000 | |
| WO | 02/05224 A2 | 1/2002 | |
| WO | 02/05224 A3 | 7/2003 | |
| WO | WO-2009094724 A1 * | 8/2009 | ............. G06Q 30/06 |
| WO | 2010/060113 A1 | 5/2010 | |
| WO | 2012/110828 A1 | 8/2012 | |
| WO | 2012/138483 A1 | 10/2012 | |
| WO | 2013/188908 A1 | 12/2013 | |
| WO | 2014/076633 A1 | 5/2014 | |
| WO | 2014/182545 A1 | 11/2014 | |
| WO | 2016/106126 A1 | 6/2016 | |

(56) References Cited

FOREIGN PATENT DOCUMENTS

| WO | 2016/106193 A1 | 6/2016 |
|---|---|---|
| WO | 2016/106216 A2 | 6/2016 |
| WO | 2016/160776 A1 | 10/2016 |

OTHER PUBLICATIONS

Ching-I Cheng et al.; or National Chung Cheng University, Ming-Hsiung 62102, Chia-Yi County, Taiwan "A 3D Virtual Show Room for Online Apparel Retail Shop"; from Proceedings of 2009 APSIPA Annual Summit and Conference, Sapporo, Japan, Oct. 4-7, 2009 ° cited in the IDS filed Aug. 20, 2021 (Year: 2009).*
Sara; "Nonprofit Helps Injured Veterans"; South Florida Sun-Sentinel ; Fort Lauderdale, Fla Mar. 22, 2009; retrieved from Dialog on Mar. 28, 2023 (Year: 2009).*
U.S. Appl. No. 09/901,954, Final Office Action dated Jul. 10, 2007, 12 pgs.
U.S. Appl. No. 09/901,954, Final Office Action dated Dec. 19, 2005, 11 pgs.
U.S. Appl. No. 09/901,954, Non Final Office Action dated Jan. 21, 2005, 11 pgs.
U.S. Appl. No. 09/901,954, Non Final Office Action dated Feb. 13, 2007, 11 pgs.
U.S. Appl. No. 09/901,954, Non Final Office Action dated Dec. 19, 2007, 10 pgs.
U.S. Appl. No. 09/901,954, Notice of Allowance dated Jun. 19, 2008, 10 pgs.
U.S. Appl. No. 10/018,237, Final Office Action dated Apr. 4, 2007, 11 pgs.
U.S. Appl. No. 10/018,237, Final Office Action dated Sep. 8, 2008, 13 pgs.
U.S. Appl. No. 10/018,237, Non Final Office Action dated Aug. 3, 2006, 11 pgs.
U.S. Appl. No. 10/018,237, Non-Final Office Action dated Mar. 27, 2008, 9 pgs.
U.S. Appl. No. 10/018,237, Notice of Allowance dated May 13, 2011, 9 pgs.
Australian Application No. 2008203005, Examiner's First Repoli on Patentability dated Oct. 29, 2008, 3 pgs.
Non-Final Office Action received for U.S. Appl. No. 14/556,677, dated Mar. 9, 2017, 26 pages.
Non-Final Office Action received for U.S. Appl. No. 14/556,677 dated May 18, 2017, 12 pages.
Non-Final Office Action received for U.S. Appl. No. 13/722,818 dated Sep. 12, 2014, 16 pages.
Non-Final Office Action received for U.S. Appl. No. 13/722,818 dated Mar. 24, 2014, 22 pages.
Non-Final Office Action received for U.S. Appl. No. 13/722,818 dated Dec. 17, 2015, 21 pages.
Non Final Office Action received for U.S. Appl. No. 14/568,251, dated Jun. 2, 2017, 24 pages,.
International Application Serial No. PCT/US2016/024659, International Search Report dated Jun. 10, 2016, 2 pgs.
Canadian Application Serial No. 2,412,184, Office Action dated Jan. 3, 2007, 5 pgs.
Canadian Application Serial No. 2,412,184, Office Action dated Aug. 31, 2007, 5 pgs.
Canadian Application Serial No. 2,832,000, Office Action dated Mar. 22, 2016, 4 pgs.
Cheng et al., A 3D Virtual Show Room for Online Apparel Retail Shop, Proceedings of 2009 APSIPA Annual Summit and Conference, Sapporo, Japan, Oct. 4-7, 2009, 7 pages.
Japanese Application Serial No. 2002-508754, Office Action dated May 16, 2011, with English translation of claims, 6 pgs.
Japanese Application Serial No. 2008-173992, Office Action dated May 16, 2011, with English translation of claims, 2 pgs.
European Application Serial No. 01951030.4, Office Action dated Jan. 20, 2006, 6 pgs.

European Application Serial No. 01951030.4, Summons to Attend Oral Proceedings dated Jul. 21, 2008, 7 pgs.
European Application Serial No. 10158849.9, Extended European Search Report dated Jun. 18, 2010, 7 pgs.
Final Office Action received for U.S. Appl. No. 13/722,818 dated Apr. 15, 2015, 16 pages.
Final Office Action received for U.S. Appl. No. 13/722,818, dated Jul. 11, 2016, 23 pages.
Final Office Action received for U.S. Appl. No. 14/568,187, dated Jun. 16, 2017, 35 pages.
First Action Interview—Office Action Summary received for U.S. Appl. No. 14/568,187, dated Mar. 13, 2017, 5 pages.
First Action Interview—Office Action Summary received for U.S. Appl. No. 14/569,197, dated Jun. 1, 2017, 5 pages.
First Action Interview—Office Action Summary received for U.S. Appl. No. 14/580,072, dated Jan. 27, 2017, 4 pages.
First Action Interview—Pre-Interview Communication received for U.S. Appl. No. 14/569,197, dated Oct. 6, 2016, 5 pages.
First Action Interview—Pre-Interview Communication received for U.S. Appl. No. 14/569,197, dated Oct. 11, 2016, 5 pages.
First Action Interview—Pre-Interview Communication received for U.S. Appl. No. 14/580,072, dated Oct. 12, 2016, 6 pages.
International Application Serial No. PCT/EP00/05359, International Search Report dated Nov. 16, 2000, 4 pgs.
International Application Serial No. PCT/US01/21725, International Search Report dated Aug. 29, 2002, 3 pgs.
International Application No. PCT/US2015/067106, Written Opinion dated Jul. 5, 2016, 13 pages.
International Application Serial No. PCT/US2015/067009, International Search Report dated Feb. 26, 2016, 2 pgs.
International Application Serial No. PCT/US2015/067044, International Search Report dated Mar. 11, 2016, 2 pgs.
International Application Serial No. PCT/US2015/067106, International Search Report dated Jul. 5, 2016, 3 pgs.
International Application Serial No. PCT/US2016/024659, Written Opinion dated Jun. 10, 2016, 6 pgs.
International Application No. PCT/US2015/067009, Written Opinion dated Feb. 26, 2016, 6 pages.
International Written Opinion received for PCT Application No. PCT/US2015/067044, dated Mar. 11, 2016, 7 pages.
U.S. Appl. No. 16/167,867, filed Oct. 23, 2018, Issued.
U.S. Appl. No. 14/503,309, filed Sep. 30, 2014, Abandoned.
02Micro Inc Files Taiwan Patent Application for Method and Device for Electronic Fitting, (Dec. 26, 2013) Global IP News. Electronics Patent News Retrieved from Dialog on Nov. 4, 2020, 2013, 1 Page.
Notice of Decision to Grant Received for Korean Patent Application No. 10-2013-7029353, dated Dec. 24, 2015, 3 pages (1 page of English Translation and 2 pages of Official Copy).
Notice of Preliminary Rejection for Korean Patent Application No. 10-2013-7029353, dated Apr. 28, 2015, 10 pages. (5 pages of English Translation and 5 pages of Official Copy).
Final Office Action received for Korean Patent Application No. 10-2016-7006944, dated Jan. 31, 2017, 5 pages. (2 pages of English Translation and 3 pages of Official Copy).
Office Action received for Korean Patent Application No. 10-2016-7006944, dated Jun. 14, 2016, 6 pages (3 pages of English Translation and 3 pages of Official Copy).
Notice of Allowance received for Korea Patent Application No. 10-2017-7024399, dated Jun. 22, 2018, 3 pages. (1 page of English Translation and 2 pages of Official Copy).
Notice of Preliminary Rejection received for Korean Patent Application No. 10-2017-7024399, dated Dec. 4, 2017, 5 pages (2 pages of English Translation and 3 pages of Official Copy).
Wikipedia,"Sequential Minimal Optimization", Retrieved from Internet URL: https://en.wikipedia.org/wiki/Sequential_minimal_optimization, Accessed on Mar. 26, 2020, 3 pages.
Telstra Corporation LTD,"In the Matter of Australian Application Serial No. 2001271968, in the name of PayPal, Inc-and-In the Matter of Opposition to the Application by Telstra Corporation Limited" "Statement of Grounds of Opposition and Particulars Relating to Each Ground", Sep. 17, 2007, 8 pages.

(56) References Cited

OTHER PUBLICATIONS

Styku,"Styku Startup Revolutionizes Apparel Shopping, Reduces Returns with Virtual Fitting Room", Retrieved from the internet URL:<file:///C:/Users/swadhwa/Downloads/Styku_Kinect_CaseStudy%20(1).pdf>, Microsoft Case Study: Microsoft Kinect for Windows-Styku, [Online]., Nov. 6, 2012, 4 pages.
Spanlang,"Garment Modelling and Visualisation", PhD dissertation, University of London, 2005, 220 pages.
Selle et al., "Robust High-Resolution Cloth Using Parallelism, History-Based Collisions and Accurate Friction", IEEE Transactions on Visualization and Computer Graphics, vol. 15, No. 2, Mar. 2009-Apr. 2009, pp. 1-12.
Final Office Action received for U.S. Appl. No. 14/270,244, dated Jul. 14, 2017, 37 pages.
Final Office Action received for U.S. Appl. No. 14/270,244, dated Jun. 17, 2019, 32 pages.
Non Final Office Action received for U.S. Appl. No. 14/270,244, dated Dec. 5, 2018, 35 pages.
Non-Final Office Action received for U.S. Appl. No. 14/270,244, dated Jan. 12, 2017, 35 pages.
Final Office Action received for U.S. Appl. No. 14/449,120, dated Jul. 27, 2017, 38 pages.
Non-Final Office Action received for U.S. Appl. No. 14/449,120, dated Feb. 8, 2017, 32 pages.
Final Office Action received for U.S. Appl. No. 14/474,003, dated Jan. 24, 2018, 23 pages.
Non-Final Office Action received for U.S. Appl. No. 14/474,003, dated Jul. 28, 2017, 25 pages.
Notice of Allowance Received for U.S. Appl. No. 14/474,003 dated Apr. 27, 2018, 10 pages.
Final Office Action received for U.S. Appl. No. 14/503,287, dated Mar. 16, 2018, 50 Pages.
Non Final Office Action received for U.S. Appl. No. 14/503,287, dated Aug. 24, 2017, 39 pages.
Appeal Decision received for U.S. Appl. No. 13/081,367, dated Mar. 1, 2016, 10 pages.
Non-Final Office Action received for U.S. Appl. No. 14/503,309, dated May 23, 2018, 14 pages.
Restriction Requirement received for U.S. Appl. No. 14/503,309, dated Sep. 13, 2017, 7 pages.
Non-Final Office Action received for U.S. Appl. No. 14/530,636, dated Nov. 5, 2015, 6 pages.
Notice of Allowance received for U.S. Appl. No. 14/530,636, dated Mar. 28, 2016, 8 pages.
Examiner's Answer received for U.S. Appl. No. 13/081,367, dated Apr. 12, 2013, 5 pages.
Examiner's Answer received for U.S. Appl. No. 13/081,367, dated Apr. 18, 2013, 8 pages.
U.S. Appl. No. 14/579,936,"Advisory Action received for U.S. Appl. No. 14/579,936, dated Sep. 12, 2018", dated Sep. 12, 2018, 3 pages.
Final Office Action received for U.S. Appl. No. 14/579,936, dated Jun. 27, 2018, 18 pages.
Final Office Action received for U.S. Appl. No. 14/579,936, dated Jul. 10, 2017, 25 pages.
Non-Final Office Action received for U.S. Appl. No. 14/579,936, dated Jan. 8, 2018, 15 pages.
Non-Final Office Action received for U.S. Appl. No. 14/579,936, dated Mar. 24, 2017, 36 pages.
Non-Final Office Action received for U.S. Appl. No. 14/579,936, dated Oct. 25, 2018, 21 pages.
Notice of Allowability Received for U.S. Appl. No. 14/579,936, dated Apr. 9, 2019, 6 pages.
Notice of Allowance received for U.S. Appl. No. 14/579,936, dated Mar. 15, 2019, 9 pages.
Final Office Action Received for U.S. Appl. No. 15/140,900, dated Aug. 15, 2019, 15 Pages.
First Action Interview—Office Action Summary received for U.S. Appl. No. 15/140,900, dated Feb. 28, 2019, 33 pages.
First Action Interview Pre-Interview Communication received for U.S. Appl. No. 15/140,900 dated Dec. 13, 2018, 30 pages.
Final Office Action received for U.S. Appl. No. 15/182,267, dated Mar. 8, 2017, 11 pages.
Non-Final Office Action received for U.S. Appl. No. 15/182,267, dated Aug. 31, 2017, 13 Pages.
Non-Final Office Action received for U.S. Appl. No. 15/182,267, dated Sep. 12, 2016, 10 pages.
Notice of Allowance received for U.S. Appl. No. 15/182,267, dated Dec. 20, 2017, 8 Pages.
Corrected Notice Of Allowability received for U.S. Appl. No. 16/054,139, dated Aug. 1, 2019, 2 pages.
Non-Final Office Action received for U.S. Appl. No. 16/054,139, dated Nov. 1, 2018, 16 pages.
Notice of Allowance received for U.S. Appl. No. 16/054,139, dated Mar. 1, 2019, 9 pages.
Notice of Allowance received for U.S. Appl. No. 16/054,139, dated Apr. 19, 2019, 9 pages.
Final Office Action received for U.S. Appl. No. 16/440,760, dated Mar. 26, 2021, 17 pages.
Okreylos,"3D Video Capture with Three Kinects", Retrieved from the Internet: <URL: https://www.youtube.com/watch?v=Ghgbycqb92c>, Accessed on (May 13, 2014), 5 minutes, 35 seconds, May 13, 2014, 3 pages.
Oregon,"ACH Debit Electronic Funds Transfer: Program Guide", Retrieved from the Internet: <URL: http://www.dor.state.or.us/19forms/206-029.pdf>,, Feb. 1999, 8 pages.
International Preliminary Report on Patentability received for PCT Patent Application No. PCT/US2012/030179, dated Oct. 17, 2013, 6 pages.
Rudolph et al., "A Simple Load Balancing Scheme for Task Allocation in Parallel Machines", Proceedings of the third annual ACM symposium on Parallel algorithms and architectures, Retrieved from the Internet URL:<http://people.csail.mit.edu/rudolph/Autobiography/LoadBalancing.pdf>, ACM, Jun. 1991, 237-245 pp.
Photoshop,"Placing An Image Inside of Another With Photoshop CS6", Retrieved from the internet: <URL: http://www.photoshopessentials.com/photo-effects/placing-an-image-inside-another-with-photoshop-cs6/>, Photoshop Tutorial archived, [Online], Sep. 9, 2014, 8 pages.
Corrected Notice of Allowability Received for U.S. Appl. No. 16/167,867, dated Jun. 9, 2021, 4 Pages.
Final Office Action Received for U.S. Appl. No. 16/167,867, dated Nov. 9, 2020, 33 Pages.
Non Final Office Action Received for U.S. Appl. No. 16/167,867, dated Jun. 26, 2020, 25 pages.
Notice Of Allowance received for U.S. Appl. No. 16/167,867, dated Feb. 26, 2021, 11 Pages.
Decision to Grant received for Korean Patent Application No. 10-2016-7006944, dated May 31, 2017, 3 pages (2 pages of Official copy & 1 page of English Translation).
Corrected Notice of Allowability Received for U.S. Appl. No. 16/523,069, dated Jun. 23, 2021, 2 Pages.
Non-Final Office Action Received for U.S. Appl. No. 16/523,069, dated Oct. 6, 2020, 16 pages.
Non Final Office Action Received for U.S. Appl. No. 16/440,760 dated Nov. 17, 2020, 14 pages.
Notice of Allowance Received for U.S. Appl. No. 16/523,069 dated Jun. 10, 2021, 9 Pages.
Notice of Allowance Received for U.S. Appl. No. 16/440,760, dated Jun. 15, 2021, 10 Pages.
Non-Final Office Action received for U.S. Appl. No. 13/081,367, dated Feb. 8, 2012, 15 pages.
Final Office Action received for U.S. Appl. No. 13/081,367, dated Jun. 14, 2012, 14 pages.
Satish et al., "Can Traditional Programming Bridge the Ninja Performance Gap for Parallel Computing Applications", 39th Annual International Symposium on Computer Architecture (ISCA), Jun. 9-13, 2012, 12 pages.
Final Office Action Received for U.S. Appl. No. 16/523,069, dated Jun. 23, 2020, 14 pages.
Final Office Action Received for U.S. Appl. No. 16/523,069, dated Mar. 26, 2021, 19 Pages.

(56) References Cited

OTHER PUBLICATIONS

Non Final Office Action Received for U.S. Appl. No. 16/523,069, dated Jan. 27, 2020, 13 pages.
Written Opinion received for PCT Patent Application No. PCT/US2012/030179, dated Apr. 13, 2012, 4 pages.
International Search Report received for PCT Patent Application No. PCT/US2012/030179, dated Apr. 13, 2012, 4 pages.
Notice of Allowance Received for Canadian Patent Application No. 2,832,000 dated Feb. 22, 2018, 1 page.
Office Action Received for Canadian Patent Application No. 2,832,000 dated Mar. 31, 2017, 5 pages.
Office Action received for Canadian patent Application No. 2,832,000, dated Jun. 21, 2019, 3 pages.
Office Action received for Canadian Patent Application No. 2,832,000, dated Mar. 22, 2016, 4 pages.
Office Action received for Canadian Patent Application No. 2,832,000, dated Mar. 27, 2015, 3 pages.
Office Action received for Canadian Patent Application No. 2,832,000, dated Oct. 23, 2018, 5 pages.
First Examination Report received for Australian Patent No. 2012240481, dated Jan. 20, 2015, 3 pages.
Notice of Acceptance received for Australian Patent Application No. 2012240481 dated Aug. 4, 2015, 2 pages.
First Examination Report received for Australian Patent No. 2015255283, dated Nov. 9, 2016, 2 pages.
Subsequent Examiners Report received for Australian Patent No. 2015255283, dated Dec. 15, 2016, 4 pages.
Yang et al., "Detailed garment recovery from a single-view image", Retrieved from the internet URL:<https://arxiv.org/pdf/1608.01250.pdf>, arXiv preprint arXiv:1608.01250, 2016, 1-13 pp.
A World Away,"Selena Mell Sends Home Her First Impressions Of A New Life In The United Arab Emirates", Community, Nov. 25, 2011, 3 pages.
Automated Clearing House Rules,""A Complete Guide to Rules and Regulations Governing the ACH Network",", The National Automed Clearing House Assocation,, 1999, 627 pages.
Basenese,"Virtual Fitting Rooms . . . Coming to a Store Near You", Retrieved from the internet URL:<https://www.wallstreetdaily.com/2011/07/07/virtual-fitting-rooms-fits-me/>, Wall Street Daily, [Online] (Aug. 13, 2014), Jul. 7, 2011, 1 page.
Binkley,"The Goal: A Perfect First-Time Fit: True Fit Is Online Retailers Latest Attempt to Help Consumers Buy Rigilt Size; No Tape Measures", Retrieved from the Internet:<URL:http://online.wsj.cominewslarticies/SB10001424052702304724404577293593210807790#printMode>, Achieving a Perfect Fit in Online Shopping WSJ, 2012, Mar. 23, 2012, 4 pages.
Black,"Drape: Dressing Any Person", (Year: 2012), 2012, 10 Pages.
Bossard et al., "Apparel classification with style", Retrieved from the internet URL:<http://www.vision.ee.ethz.ch/~lbossard/bossard_accv12_apparel-classification-with-style.pdf>, Computervision ACCV 2012, Springer Berlin Heidelberg, 2012, pp. 321-335.
Bryant,"Fits.me Launches Robot to Help Women Size Up Clothes Online", Retrieved from the URL internet :<https://thenextweb.com/eu/2011/06/10/fits-me-launches-robot-to-help-women-size-up-clothes-online/#.tnw_BRXPLr8L>, Jun. 10, 2011, 4 pages.
Chang,"Virtual dressing rooms changing the shape of clothes shopping", Retrieved from the Internet URL: <https://phys.org/news/2012-07-virtual-rooms.html>, Jul. 23, 2012, 3 pages.
Chang,"Virtual Fitting Rooms Changing the Clothes Shopping Experience", Retrieved from the internet URL:<http://articles.latimes.com/2012/jul/13/business/la-fi-virtual-dressing-room-20120714>, Los Angeles Times, [Online], Jul. 13, 2012, 3 pages.
Cheng et al., "A 3D Virtual Show Room for Online Apparel Retail Shop", In Proceedings: APSIPA ASC 2009: Asia-Pacific Signal and Information Processing Association, Annual Summit and Conference. Retrieved from the internet URL: < http://www.apsipa.org>, In Proceedings: APSIPA ASC 2009: Asia-Pacific Signal and Information Processing Association, Annual Summit and Conference, Oct. 4-7, 2009, 193-199.

Criminisi et al., "Single View Metrology", International Journal of Computer Vision, vol. 40, Issue 2, 2000, 123-148 pp.
Decaudin et al., "Virtual garments: A fully geometric approach for clothing design", In Computer Graphics Forum, vol. 25, No. 3, pp. 625-634. Oxford, UK and Boston, USA: Blackwell Publishing, Inc, 2006.
Feng et al., "A deformation transformer for real-time cloth animation", Retrieved from the internet URL:<http://i.cs.hku.nk/~yzyu/publication/dtcloth-sig2010 pdf>, Proceedings of ACM SIGGRAPH 2010, vol. 28, Issue 4,, Jul. 2010, 1-9 pp.
Fuhrmann et al., "Interaction-free dressing of virtual humans", Computers & Graphics 27, No. 1, 2003, pp. 71-82.
Gioberto,"Garment-Integrated Wearable Sensing for Knee Joint Monitoring", Proceedings of the 2014 ACM International Symposium on Wearable Computers: Adjunct Program, Sep. 13-17, 2014, 113-118 pages.
Gioberto et al., "Overlock-Stitched Stretch Sensors: Characterization and Effect of Fabric Property", Journal of Textile and Apparel, Technology and Management, vol. 8, Issue 3, 2013, 14 pages.
Harwood et al., "The Use Of The Kawabata Evaluation System For Product Development And Quality Control", Dept of Technology, Scottish College of Textiles, Galashiels, Selkirkshire, Scotland TDI 3HF, Journal of the Society of Dyers and Colourists, vol. 106, No. 2, Feb. 1990, pp. 64-68.
Horne,"Letter from Gowling Lafleur Henderson LLP to Park, Vaughan and Fleming LLP", Jul. 21, 2004, 3 pages.
Hughes et al., "Physical simulation for animation and visual effects: parallelization and characterization for chip multiprocessors", In ACM SIGARCH Computer Architecture News, vol. 35, No. 2, May 2007, 12 pages.
Jassim,"Semi-Optimal Edge Detector based on Simple Standard Deviation with Adjusted Thresholding", International Journal of Computer Applications 68, No. 2, 2013, pp. 43-48.
Jojic et al., "A framework for garment shopping over the Internet", Handbook on Electronic Commerce, Chapter 12, Handbook on Electronic Commerce, 2000, 22 pages.
Karsch et al., "Rendering synthetic objects into legacy photographs", ACM Transactions on Graphics (TOG). vol. 30. No. 6, 2011, 12 pages.
Krashinsky,"Vector-Thread Architecture And Implementation", Retrieved from the internet URL:<http://scale.eecs.berkeley.edu/papers/krashinsky-phd.pdf>, Massachusetts Institute of Technology, Thesis to the Dept. of Computer Science, May 2007, 1-186 pp.
Kristensen et al., "Towards a Next Generation Universally Accesible 'Online Shopping-for-Apparel' System", Retrieved from the internet URL:<http://vbn.aau.dk/files/78490156/VDR_paper_from_HCII2013_V03_LNCS8006_978_3_642_39264_1.pdf>, Human-Computer Interaction, Part III, HCII 2013, LNCS 8006, 2013, pp. 418-427.
Li et al., "Wearable Sensors in Intelligent Clothing for Measuring Human Body Temperature Based on Optical Fiber Bragg Grating", Retrieved from the Internet: <URL: htp://ro.uow.edu.au/eispapers/298>, Optics Express, vol. 20, Issue 11, May 9, 2012, 11740-11752 pp.
Lim et al., "Characterization of noise in digital photographs for image processing", https://www.spiedigitallibrary.org/conference-proceedings-of-spie/6069/60690O/Characterization-of-noise-in-digital-photographs-for-image-processing/10.1117/12.655915.short, Feb. 10, 2006, 10 pages.
Luo et al., "Reactive 2D/3D garment pattern design modification", Computer-Aided Design, vol. 37, No. 6, May 2005, pp. 623-630.
McDonnell et al., "Pipeline for Populating Games with Realistic Crowds", Int. J. Intell Games & Simulation 4, No. 2, Oct. 31, 2018, 16 pages.
Niceinteractive,"Virtual Dressing Room", Retrieved from the Internet: <URL: https://www.youtube.com/watch?v=UhOzN2z3wtI>, (Sep. 3, 2012),, 2 minutes, 14Seconds, Aug. 3, 2017, 2 pages.
O'Brien,"Fits.me—Imitates Ladies of All Shapes and Sixes, Tries Clothes on for you (video)", Retrived from the internet URL:<https://www.engadget.com/2011/06/13/fits-me-imitates-ladies-of-all-shapes-

(56) References Cited

OTHER PUBLICATIONS and-sizes-tries-clothes-o/>, (Accessed Aug. 13, 2014), Jun. 13, 2011, 10 pages.

* cited by examiner

GARMENT SIZE MAPPING

CLAIM OF PRIORITY

This application is a Continuation of U.S filed. application Ser. No. 16/167,867, filed Oct. 23, 2018, now U.S. Pat. No. 11,055,758, which is a Continuation of U.S. application Ser. No. 14/503,309, filed Sep. 30, 2014, which are hereby incorporated by reference in their entirety.

TECHNICAL FIELD

The present application relates generally to the technical field of three-dimensional (3-D) shape comparisons, and in particular to identifying a size mappings and matches between a client and a garment in an environment such as a cross-border transaction where standard size or shape translations are not readily available.

BACKGROUND

Shopping for clothes in conventional (e.g., non-online) can be an arduous task and, due to travelling and parking, can be very time consuming. With the advent of online shopping, consumers may purchase clothing, while staying home, via a computer or any electronic device connected to the Internet. Additionally, purchasing clothes online can be different in comparison to purchasing clothes in a store. One difference is the lack of a physical dressing room to see if and how an article of clothing fits the particular consumer. Since different consumers can have different dimensions, seeing how an article of clothing fits, by use of a dressing room, can be a very important aspect of a successful and satisfying shopping experience. Additional difficulties may arise in a cross-border or multi region transaction situation, where a consumer may not be familiar with the sizing conventions used to describe a garment that the consumer is considering purchasing.

The systems and methods described in the present disclosure attempt to provide solutions to the problems presented above.

DESCRIPTION OF EMBODIMENTS

Figure 1:
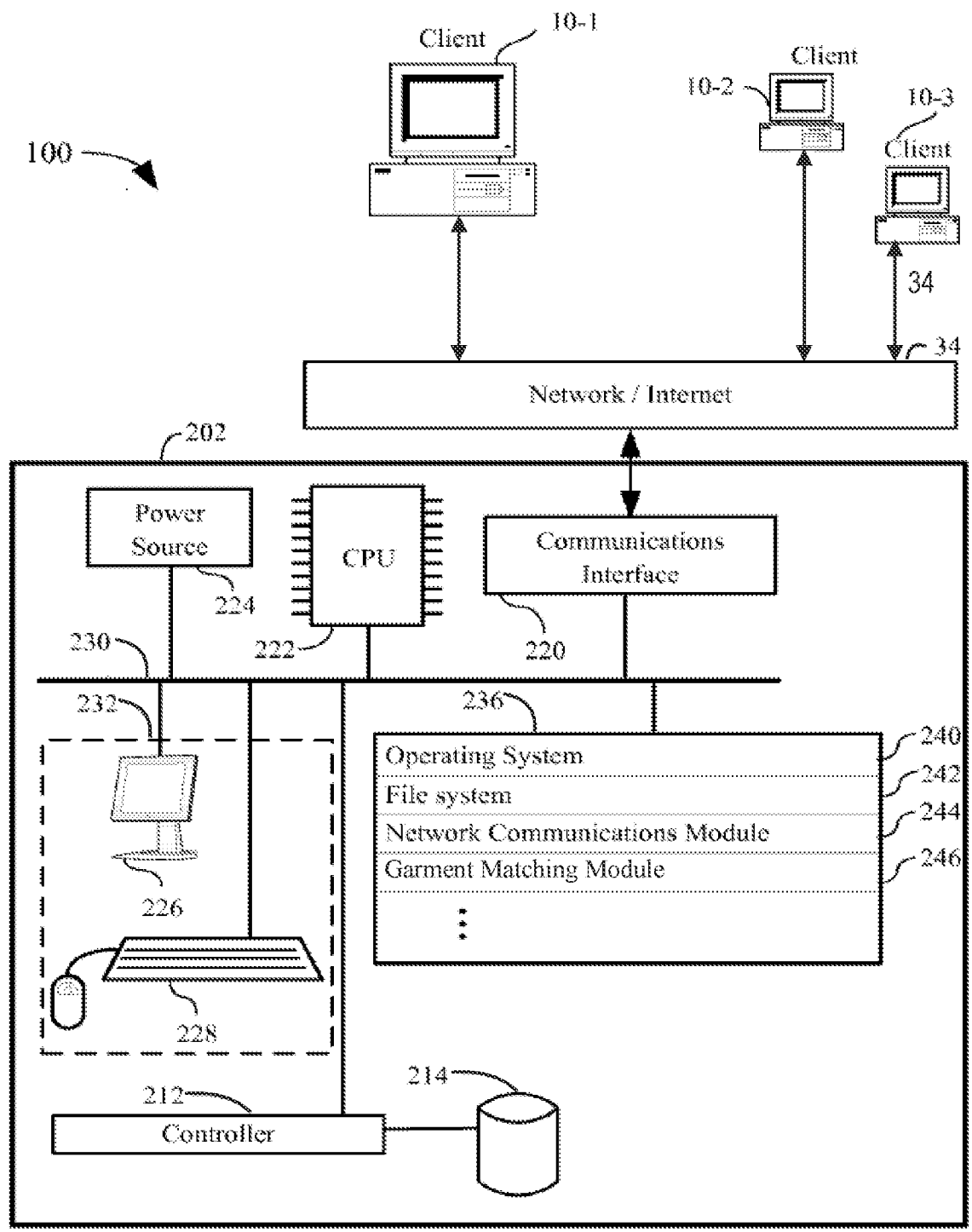
FIG. 1 illustrates an exemplary system for garment matching, in accordance with embodiments of the present disclosure.

Embodiments described herein related to three-dimensional (3-D) shape mapping and comparisons, and in particular to identifying a size match between a client and a garment in an environment such as an online cross-border transaction where standard size or shape translations are not readily available.

Purchasing in such a cross border transaction environment or when a consumer is shopping in a different country or region may be difficult because of sizing differences, size differences, shape differences, or other differences between garments and garment description conventions. Embodiments described herein map sizes, shapes, brands, and other such garment details to a standardized size scale which may be compared with and presented to a user in terms of a user's "base" size or wardrobe. This may enable a user to make better purchasing decisions and minimize the need for returns.

For example, a client in China who likes a certain brand in a certain size can provide this information to an embodiment system. The system may analyze this information with other information about a target garment or target garment type, and may then provide the user with recommendations for specific sizes, brands, designs, or other such purchase recommendations when the client is travelling or shopping in another region with different sizing standards, such as the United States. In still further embodiments, style and shape information may be provided to a system by a client. This information may be analyzed to recommend items that have similar style and shape characteristics based on a direct analysis of the clothes, even when different terms or languages are used to describe the style in marketing, sales, and general description information. Such analysis may further recommend items that keep a user's base shape and style tastes intact while the user shops in a different country, or may alert a user that they may not be able to get items that exactly fit the user's preference while still fitting in with the local garment source's styles and customs.

In addition to comparing a client's size and taste with garments for potential purchase, systems may gather information about a client's size and about target garments in a variety of ways. Garment models may be generated based on images or pictures of a physical garment. Computer aided design (CAD) files with details about certain garments may be accessed. History data about purchases made by a client and by other clients may also be used. Any and all of these types of information may be gathered by a system, and standardized to map base information about a client to information about target garments. Additional details related to both the gathering of garment information and the mapping processes are described below.

Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Reference is made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

FIG. 1 is a block diagram illustrating a system 100 in accordance with one embodiment of the present disclosure. The system 100 includes client devices (e.g., client device 10-1, client device 10-2, client device 10-3) connected to server 202 via network 34 (e.g., the Internet). Server 202 as shown includes one or more processing units (CPUs) 222 for executing modules, programs and/or instructions stored in memory 236 and thereby performing processing operations; one or more communications interfaces 220; memory 236; and one or more communication buses 230 for interconnecting these components. Communication buses 230 optionally include circuitry (e.g., a chipset) that interconnects and controls communications between system components. Server 202 also includes power source 224 and controller 212 coupled to mass storage 214. System 100 optionally includes a user interface 232 comprising a display device 226 and a keyboard 228. In other alternative embodiments, server 202 may include alternate combinations of the elements described above, or may include additional elements not described here.

Memory 236 may be high-speed random access memory, such as dynamic random-access memory (DRAM), static random-access memory (SRAM), double data rate random-access memory (DDR RAM) or other random access solid state memory devices; and may include non-volatile memory, such as one or more magnetic disk storage devices, optical disk storage devices, flash memory devices, or other non-volatile solid state storage devices. Memory 236 may optionally include one or more storage devices remotely located from the CPU(s) 222. Memory 236, or alternately the non-volatile memory device(s) within memory 236, comprises a non-transitory computer readable storage medium. In some embodiments, memory 236, or the computer readable storage medium of memory 236, stores the following programs, modules and data structures, or a subset thereof: an operating system 240; a file system 242; a network communications module 244; and a garment matching module 246.

Garment matching module 246 may be implemented as part of server 202 to implement certain embodiments for garment matching as described herein. In other embodiments, such a garment matching module may be implemented on multiple devices, and may be implemented in a server-only architecture with a server such as server 202 presenting an interface to a user on a client device 10, in a client-server architecture with aspects of a garment matching module operating partially on a client device 10 and partially on a server such as server 202, or as a client application with the entirety of a system operating on a client device such as client device 10-1 with no associated server 202. Additional details related to certain embodiments of a garment matching module 246 are described below.

The operating system 240 can include procedures for handling various basic system services and for performing hardware dependent tasks. The file system 242 can store and organize various files utilized by various programs. The network communications module 244 can communicate with client devices (e.g., client device 10-1, client device 10-2, client device 10-3) via the one or more communications interfaces 220 (e.g., wired, wireless), the network 34, other wide area networks, local area networks, metropolitan area networks, and so on. In certain embodiments where cross border transactions involve multiple languages, a communication module within memory 236 may function to automatically translate information associated with a target garment that is in a second language into a first language that is associated with a client. This may enable a client that is familiar with a first language to shop and select an appropriate size even when the size information is presented in a second language that the client does not understand.

The network 34 may be any network that enables communication between or among machines, databases, and devices (e.g., the server 202 and the client device 10-1). Accordingly, the network 34 may be a wired network, a wireless network (e.g., a mobile or cellular network), or any suitable combination thereof. The network 34 may include one or more portions that constitute a private network, a public network (e.g., the Internet), or any suitable combination thereof. Accordingly, the network 34 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., Wi-Fi network or WiMAX network), or any suitable combination thereof. Any one or more portions of the network 34 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The server 202 and the client devices (e.g., client device 10-1, client device 10-2, client device 10-3) may each be implemented in whole or in part by a computer system. A particular embodiment of one possible implementation of such a computer system is described below with respect to FIG. 10.

Any of the machines, databases, or devices shown in FIG. 1 may be implemented in a computer operating with a processor executing standardized instruction sets and modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 10. Such a special-purpose computer may operate any number of modules using one or more processors to implement various embodiments described herein for garment size matching in a cross-border transaction.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

Although FIG. 1 shows a system 100, FIG. 1 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 1 could be implemented on single servers and single items could be implemented by one or more servers.

Figure 2:
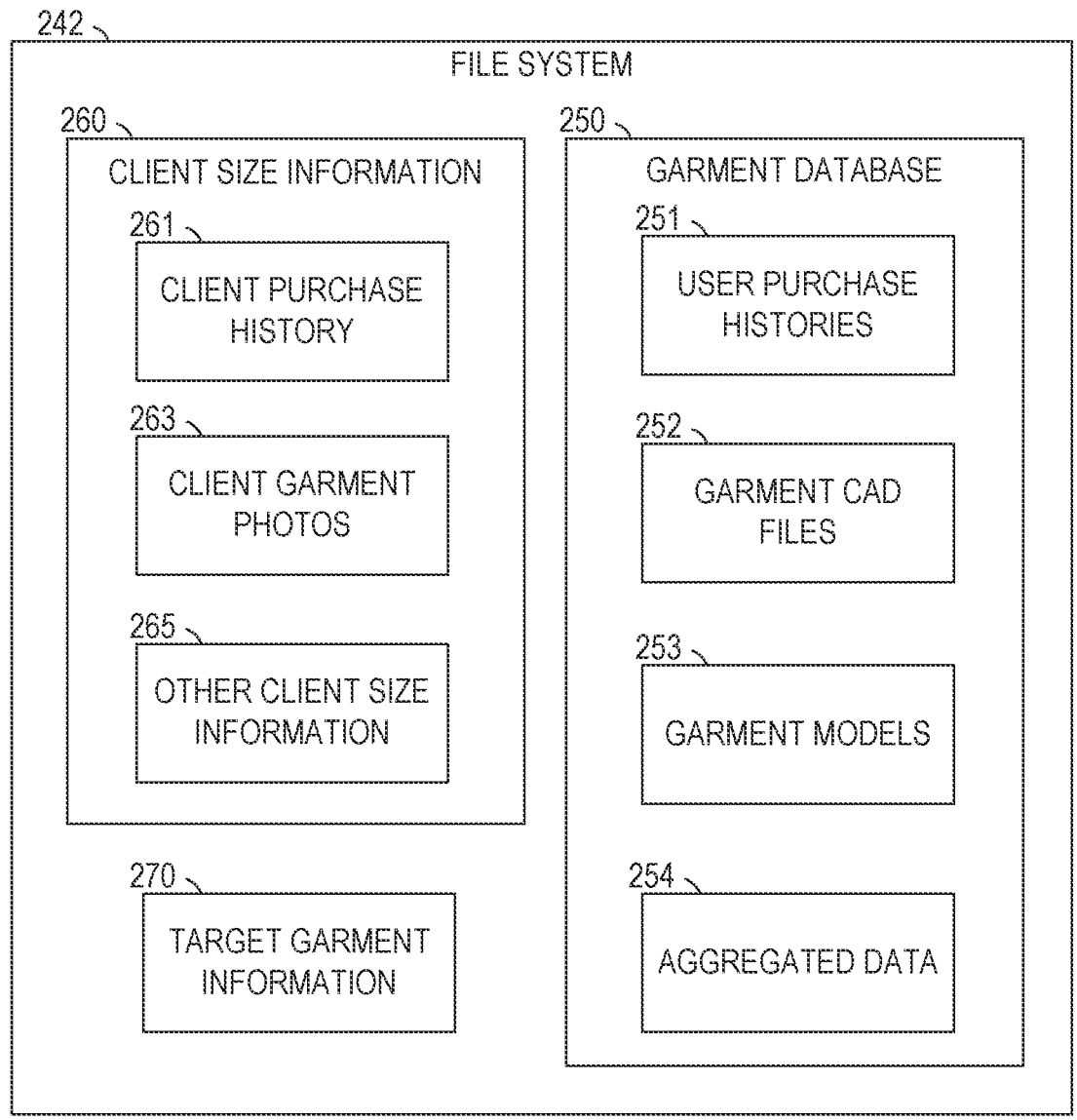
FIG. 2 is a block diagram illustrating an exemplary file system, in accordance with embodiments of the present disclosure.

FIG. 2 further describes the exemplary memory 236 in server 202, as initially described in FIG. 1. FIG. 2 includes an expanded depiction of exemplary file system 242. File system 242 may include any number of data structures and systems, including a garment database 250, client size information 260, and target garment information 270.

As shown in FIG. 2, client size information 260 includes a client purchase history 261, client garment photos 263, and other client size information 263. Client size information 260 may include multiple types of information, including any combination of client purchase history 261, client garment photos 263, or other client size information 265. In certain embodiments, client size information 260 may comprise photographs of a client in well-fitting clothing. Client size information 260 may also comprise information regarding another individual other than the user that the user has identified as their size proxy. Such client size information 260 may include any information about the size proxy such as size information for well-fitting clothing belonging to the size proxy, measurements associated with the size proxy, or any other such information. Identifying a size proxy may also simply involve associating another client who size information is held by the system with the current client. A size proxy may be a person known to the client, a model provided by a system, or any other such person that may have measurements similar to a client's measurements. Client size information 260 may be text describing client body size measurements, measurements associated with a client's favorite garments, measurements associated with a history of client purchases and returns, or other such text information that may be used to generate a base size for a client. A base client size as described herein refers to a system determined value or set of values that is used to represent an estimate of a preferred or ideal size for a client. This base client size may then be mapped to a standardized size scale along with the available sizes of a target garment in order to create a recommendation. In certain embodiments, a base client size may be a three dimensional model of a garment. In other embodiments, a base client size may be a set of linear measurements associated with a client body shape. In other embodiments a base client size may be a value representing a number of other measurements, where the value has been standardized as part of a brand's size scale, or a set of regionally standardized measurements associated with ready-to-wear clothes offered in the area.

In addition to including text descriptions, client size information 260 may also be images of one or more garments that may be analyzed and modeled to determine a base client size. In other embodiments, any data relevant to determining a base client size may be included in client size information 260. Client size information 260 may be received from a client device 10 and stored temporarily within file system 242, or may be received and then stored permanently as part of a garment database 250. In certain embodiments, client size information 260 may be received as part of a size matching processes requested by a particular client, with client size information 260 stored in file system 242 for use during the client's size matching process. Identifying details from the client size information 260 may then be removed, and the details of client size information 260 stored anonymously in user purchase histories 251. This information may then be used for later size matching processes by other clients.

Client purchase history 261 may refer to information input by a client into a user interface presented at a client device such as client 10 of FIG. 1. Client purchase history 261 may alternatively be a purchase history that is accessed by a third party device, or by a module operating on a client device that records a history of client purchases and returns. The history of client purchases and returns, including size details, brand details, or other information related to the size and shape of purchased and returned garments previously involved in transactions with a client may be sent directly as part of client size information 260, or may be filtered to send particular details by a client module. In certain embodiments, such a client module may operate as part of a service to provide size matching, and may involve a user registration, where a user provides registration details to a web server associated with server 202 and the client module, and agrees to have purchase information gathered and stored as part of service operation. In certain embodiments, such a service may be provided on a stand-alone basis independent of any of the client purchases. In other embodiments, an Internet sales portal may provide such a service in conjunction with sales made to the client. In such a system, the collection and storage of data may be performed entirely by one or more servers associated with transactions involving the client and the service provider.

In certain embodiments, client size information 260 may comprise images of a garment, part of a garment, or multiple garments as client garment photos 263 that may be analyzed to derive a base client size. Additional details related to use of such images are described below, particularly with respect to FIGS. 7-9. In other embodiments, client purchase history 261, client garment photos 263, and other client size information 265 may all be used as part of a single process to generate a size map and recommend a size to a user.

In addition to the file system comprising client size information 260, the system may also store target garment information 270. Such target garment information 270 may comprise information about a particular garment design, a particular style, or a general client preference. In certain embodiments, this may include general search terms, one or more images of a garment that a client is searching for or wishes to receive a size recommendation for, style and shape preferences associated with a client including example brands, sizes, shapes, and styles, or any other such information related to a user search for one or more garments. This information may be received from a client or client device as part of a size match request, or this information may be stored in a client profile as part of a service provided to a client by a server 202. In certain embodiments, target garment information may identify a web page or sales portal associated with a specific garment design. This target garment information may then be used identify details related to the garment in a garment database 250. Such details may include information from the web page that may be placed into garment database 250 as part of file system 242, and may identify a plurality of sizes available in the specific garment design.

Garment database may 250 may include user purchase histories 251, garment CAD documents 252, garment models 253, and aggregated data 254. User purchase histories 251 may include information gathered from client purchase history 261 instances, which may be placed in garment database 250 with information from any number of different clients. This information may be used to generate size, shape, and style matching data as aggregated data 254. For example, if a particular group of clients all order size 1 of brand A, and size 5 of brand B, this information may be used, at least in part, to map size 1 of brand A to size 5 of brand B. Similar groups of clients ordering other sizes of both brand A and brand B may create information about a plurality of sizes for a particular brand. Similar mappings may be created for countries, regions, particular designs, brands and other groupings relevant to a garment database.

Garment database may also include garment CAD files 252. These files may include measurements and design details related to the expected size and construction of various sizes of a particular garment design. A CAD file 252 may also include details of materials used in a garment, and properties of the materials such as stretching characteristics, malleability, bendability, thickness, or other such material properties. This information may be gathered from a designer or created by an analysis of garments. This information may then be used in conjunction with other information about a garment to create a mapping and recommendation for a client based on client preferences.

Garment models 253 as described herein refer to simulations and/or computer structures which describe a garment, a garment style, a garment brand, and/or other such garment information. Such garment models 253 may be generated in a variety of ways, including custom models created by a system administrator. In certain embodiments, garment models 253 may be generated automatically from images. These images may be received as part of client size information from one or more users, or may be generated by an operator of a server 202. Additional details related to generation of such models is described below with respect to FIGS. 7-9.

Aggregated data 254 may take any information from user purchase histories 251, garment CAD files 252, garment models 253, and generate preprocessed information about one or more garment designs, styles, shapes, or associations between any of these and a particular area, country, or client preferences. As a system operates and additional client size information 260 is received, this information may be automatically integrated into garment database 250 and used to update aggregated data based on input information. Additionally, if a user makes a purchase based on a system recommendation or does not make a purchase following a recommendation, this information may also be used as feedback into garment database 250 to update models, associations, and expected preferences associated with certain garments, garment types, or garment styles.

Figure 3:
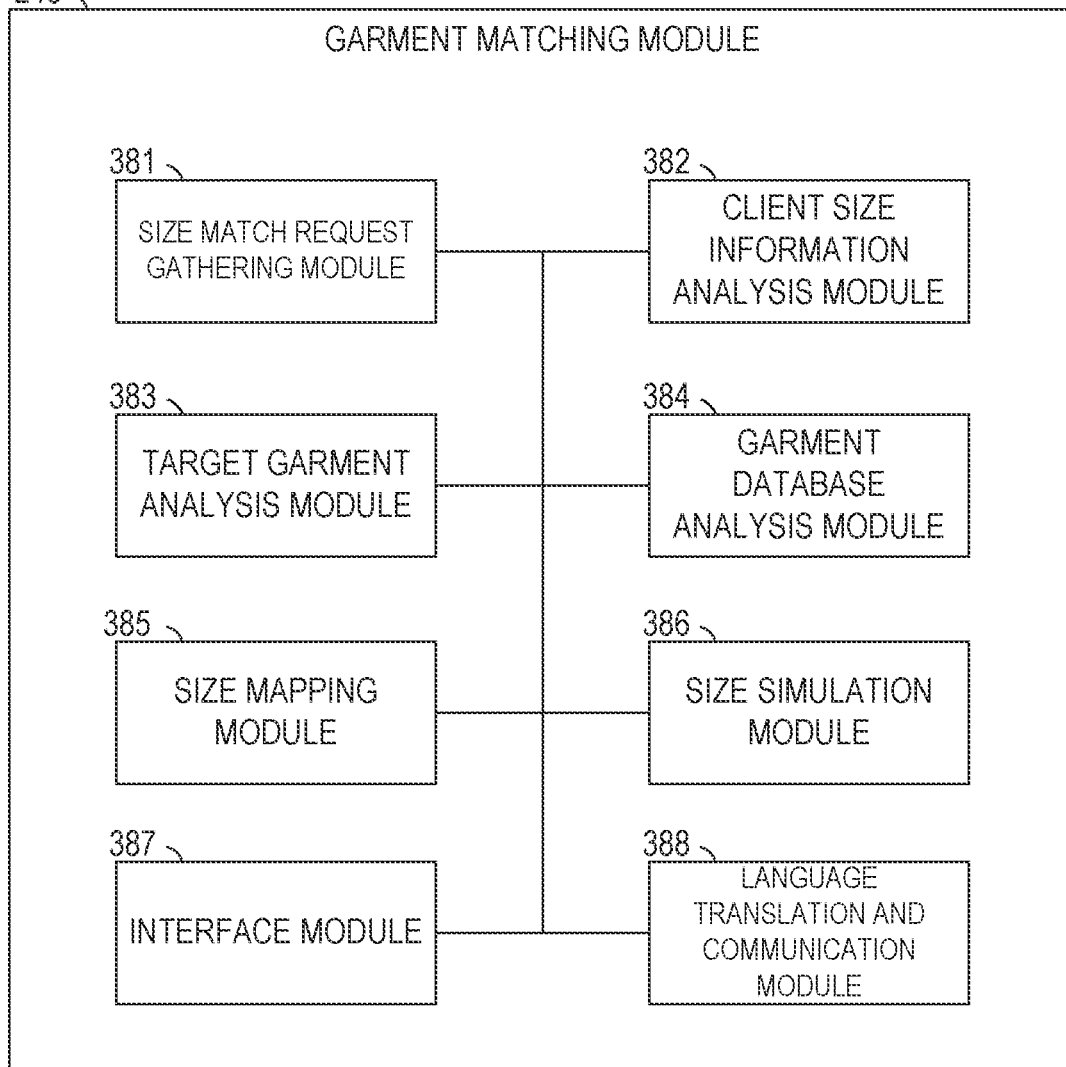
FIG. 3 is a block diagram illustrating an exemplary garment matching module, in accordance with embodiments of the present disclosure.

FIG. 3 is a block diagram illustrating components of the garment matching module 246, according to some example embodiments, as initially described in FIG. 1. The garment matching module 246 is shown as including a size match request gathering module 381, a client size information analysis module 382, a target garment analysis module 383, a garment database analysis module 384, a size mapping module 385, a size simulation module 386, an interface module 387, and a language translation and communication module 388.

Size match request gathering module 382 may operate to coordinate and receive size match requests from client devices 10 received via network 34, communications interface 220, and network communications module 244. It may additionally parse text size information such as client purchase history 261 information, and may identify client garment photos 263 to be stored as client size information 260 which is received as part of a size match request from a particular client. Size match request gathering module 382 may also identify target garment information 270 which is received as part of a size match request, and may direct the information to be stored in the correct portion of file system 242 and to be processed by the appropriate process of garment matching module 246.

Once client size match request gathering module 381 has processed an incoming size match request, client size information analysis module 382 may process the client size information from a size match request to identify a base client size. This may be done by simply parsing text size information provided by a client to a standardized size scale, by analyzing garment details associated with the client to identify the base client size, or by generating a garment model and then deriving a base client size from the garment model.

Target garment analysis module 383 analyzes target garment information to identify one or more target garments to be matched with a base client size. As part of this process, target garment analysis module 383 may interact with garment database analysis module 384 to identify garments from garment database 250 which most closely match the target garment information from a size match request. For example, if the target garment information identifies a particular garment style, then target garment analysis module 383 may use garment database analysis module 384 to identify a set of target sizes associated with the particular garment style using information from garment database 250. If, on the other hand, the target garment information describes client shape and style preferences without identifying a particular garment style, the target garment analysis module may identify measurement characteristics associated with segments of a garment, and pass these characteristics to the garment database analysis module 384 to identify garments that are within a threshold of matching such characteristics. The threshold values may be input by a system administrator to match predetermined shape and style expectations. In other embodiments, the threshold values may be based on an analysis of previous responses to client recommendations stored in user purchase histories 251 and aggregated data 254. The thresholds may then be based at least in part on user purchases and returns made following a system mapping and recommendation.

If the client size information, the target garment information, or garment database images are involved in an analysis to determine a base client size or a target garment, size simulation module 386 may be used to analyze the images and create a garment model 253. Details of such garment model creation are described below with respect to FIGS. 7-9. Once a garment model 253 is created by size simulation module 386, it may be analyzed to identify one or more particular sizes associated with the modeled garment, and may be used as part of a mapping process.

Once a base client size, one or more target garments, and a set of target garment sizes have been identified, size mapping module 385 may then determine a standardized size scale which may be used as a basis for mapping a base client size and a set of target garment sizes. Such a standardized size scale may be based on linear measurements of aspects of a garment, on a complex three dimensional model of each size of each garment and a base client size, or on any other such scale. The size scale may also incorporate information about formation properties of the garments such as stretch or other properties such as thermal behavior which may be used for comparison between garments or materials. Once the base client size and the set of target garment sizes have been placed on the standardized size scale, a comparison may be done to determine which target garment size of the set of target garment sizes is closest to the base client size.

If the standardized size scale is based on linear measurements of parts of a garment or user size, then the closest size of the set of target garment sizes may be the size which has the least linear difference value with the base client size. In other embodiments, certain measurements may be weighted more heavily, or the closest match may be the size which has the closest match without having any dimension that is smaller than a base client size dimension. In other embodiments, a threshold match difference may be set, such that if no target garment size of the set of target garment sizes meets the threshold criteria, then the system will not provide a size recommendation, or will recommend against purchase of a garment design.

As part of system operation, an interface module 387 may be used to present an interface to both system operators and to clients using a system. In certain embodiments, a user interface from interface module 387 may be communicated to a client device 10 to accept a size match request from a client. In other embodiments, a user interface from interface module 387 may be presented to a system operator to select threshold settings associated with system operation. Similarly, language translation and communication module 388 may manage communications with a client, and may operate to translate size and descriptive materials when target garment details and sizes are available in a language different that the language of a client. For example, an interface module 387 may receive a language preference input from a client indicating that the client does not understand French, but wishes to request a size match for a garment from a website that is presented in French, and to receive the results in Mandarin. A size match request to the system from a client device may provide details for generating a base client size, and may identify a website for a garment that is presented in French. The system may receive the information, identify the base client size and a plurality of target garment sizes, and map the base client size to the set of target garment sizes. The system may then generate a size recommendation communication in Mandarin, and convey that message to a client device. The communication in Mandarin may include not only size match recommendation, but may include instructions for how to select the appropriate size on a website that is presented in French. The instructions may thus enable the client to order the recommended garment as part of a cross border transaction in a language that the client does not understand. In other embodiments, language translation and communication module 388 may automatically translate the information from the web page, and act as an intermediary not only to recommend the correct size in a language that the client understands, but also to implement the transaction on behalf of the client by communicating with website on behalf of the client. This may enable a client to select an input on an interface module 387 to accept a system recommendation, and to initiate an order for the garment in the recommended size using the system as an intermediary.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 236 may store a subset of the modules and data structures identified above. Furthermore, memory 236 may store additional modules and data structures not described above.

The actual number of servers used to implement a size matching module 246 and how features are allocated among them will vary from one implementation to another, and may depend in part on the amount of data traffic that the system handles during peak usage periods as well as during average usage periods.

Figure 4:
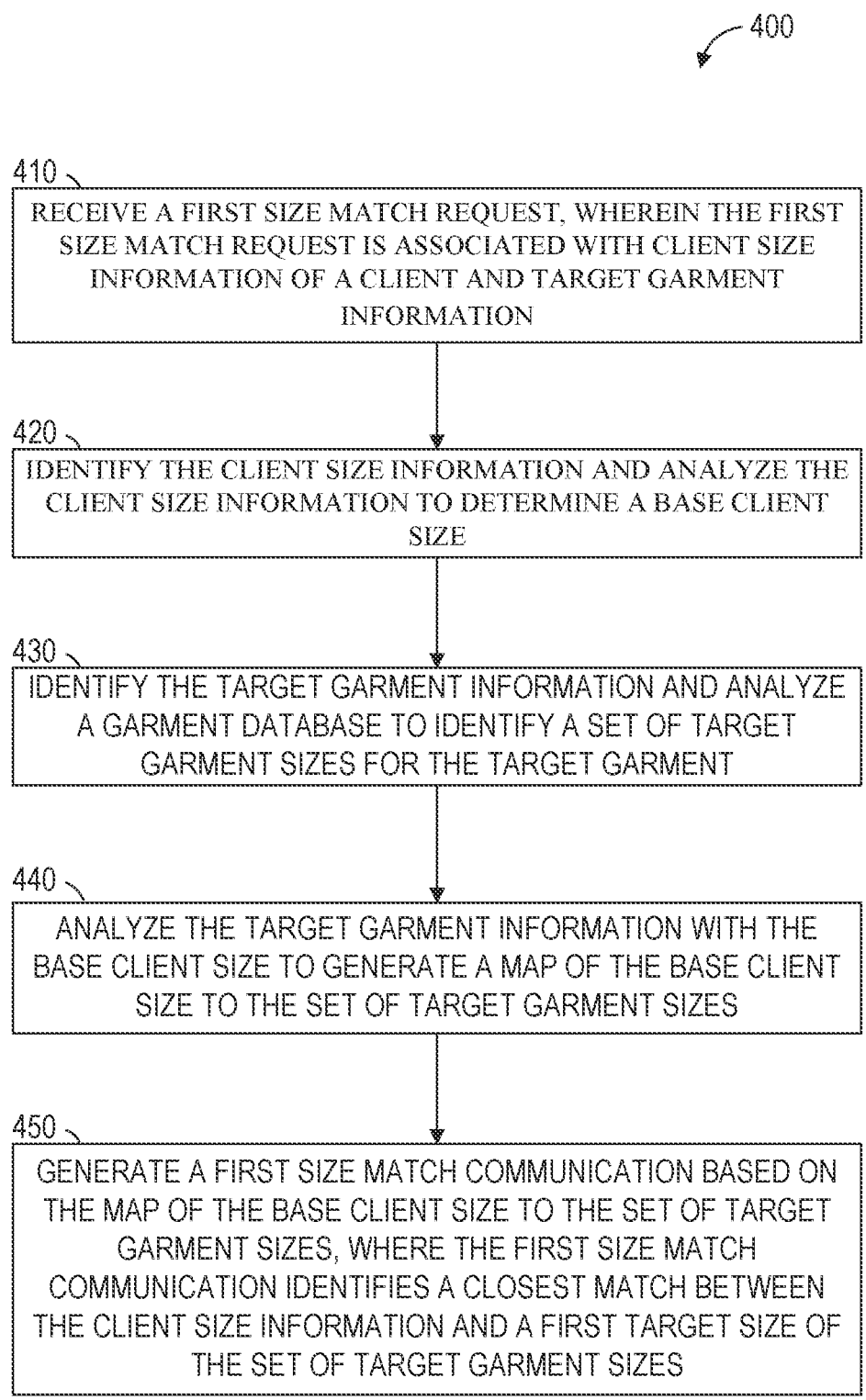
FIG. 4 is a flow diagram of a process for size matching, according to certain embodiments of the present disclosure.
Figure 5:
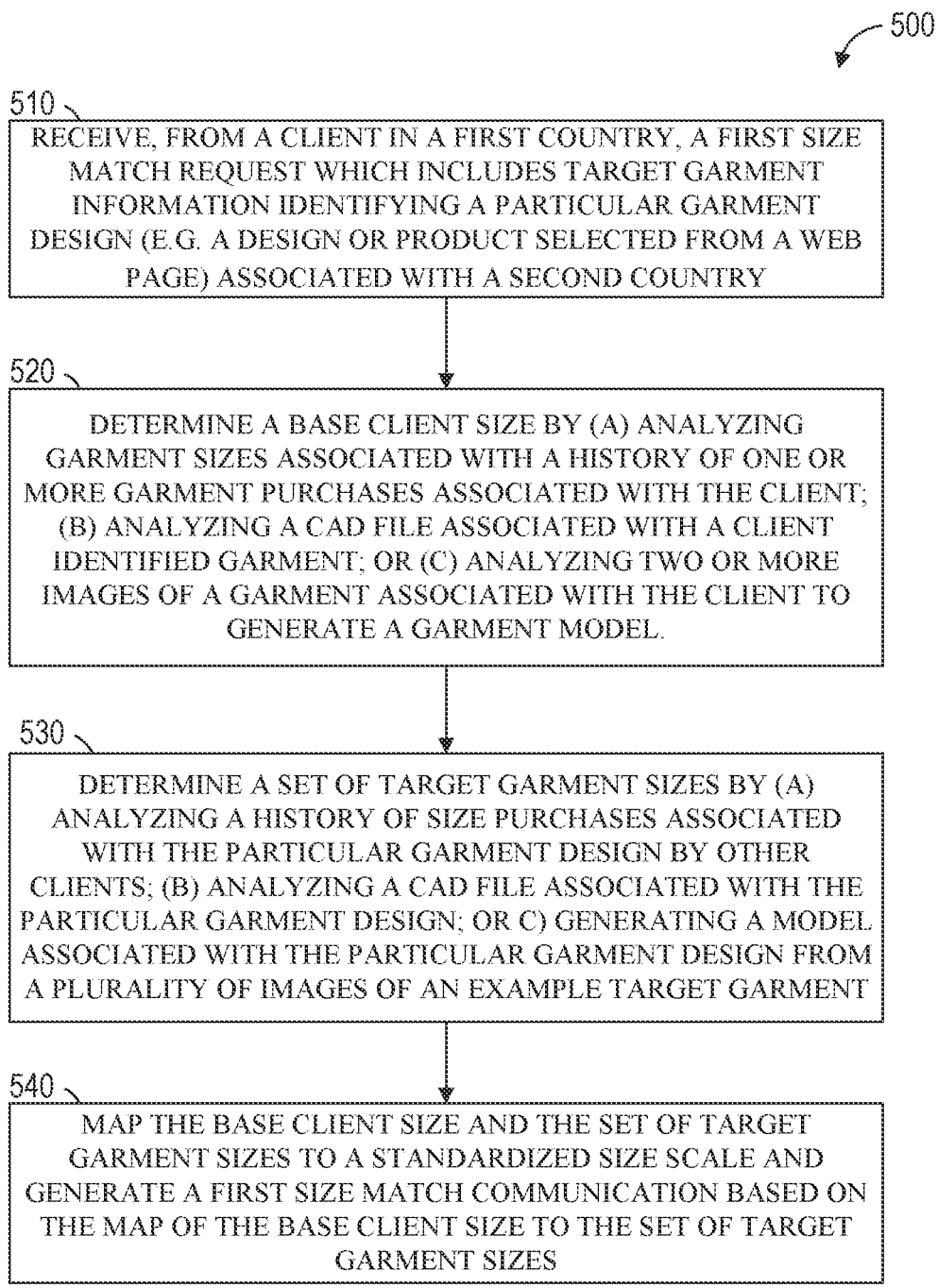
FIG. 5 is a flow diagram of a process for size matching, according to certain embodiments of the present disclosure.
Figure 6:
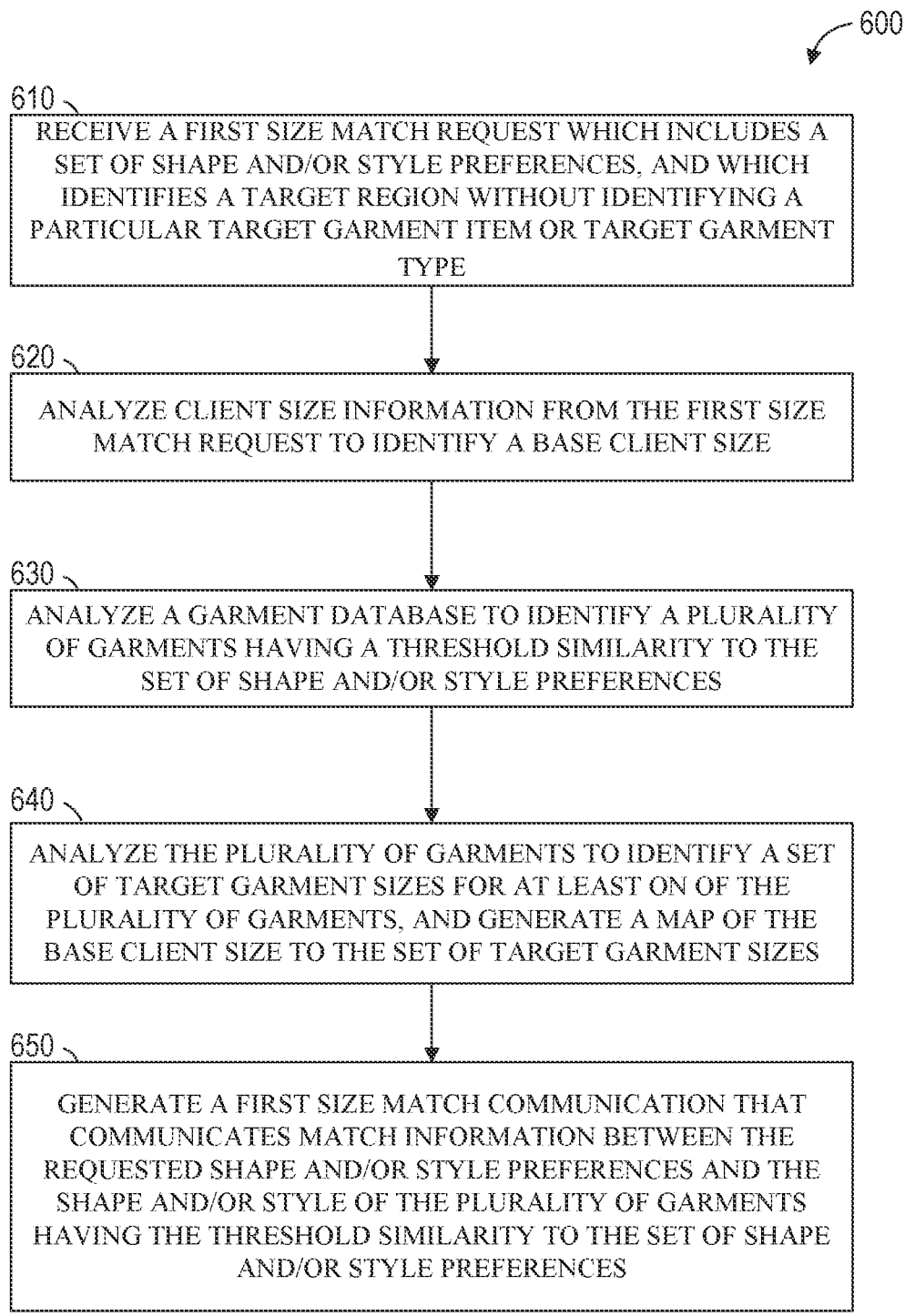
FIG. 6 is a flow diagram of a process for size matching, according to certain embodiments of the present disclosure.

FIGS. 4-6 are flowcharts representing different methods of size mapping according to various embodiments. In certain embodiments, the methods are governed by instructions stored in a computer readable storage medium and that are executed by one or more processors of one or more servers. Each of the operations shown in FIGS. 4-6 may correspond to instructions stored in a computer memory or computer readable storage medium.

Operations in the various methods 400, 500, and 600 of FIGS. 4-6 may be performed by the server 202, using modules described above with respect to FIG. 3. The computer readable storage medium may include a magnetic or optical disk storage device, solid state storage devices such as flash memory, or other non-volatile memory device or devices. The computer readable instructions stored on the computer readable storage medium are in source code, assembly language code, object code, or other instruction format that is interpreted by one or more processors.

The foregoing description, for purposes of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

Method 400 of FIG. 4 begins at element 410 with a system receiving, from a first user system, a first size match request associated with a cross border transaction, wherein the first match size match request comprises client size information and target garment information. Such information may be processed by a garment matching module 246, with information from the first size match request stored in a file system 242. In certain embodiments, a system may be receiving size match requests from multiple users, such that second, third, and any number of other size match requests may be received and processed while the system is responding to the first size match request as described by method 400.

Method 400 continues in element 420 with identifying the client size information and analyzing the client size information to determine a base client size. This identification and determination may be performed by a client size information analysis module 382 as described above, or by any other such analysis process.

Element 430 then involves identifying the target garment information and analyzing a garment database to identify a set of target garment sizes. This identification may be performed by a module such as target garment analysis module 383 in conjunction with a garment database analysis module, or by any other such module or group of modules. In various embodiments, this may involve the use of a size simulation module 386 if any size determination is based on a model. In certain embodiments, the size determinations may be made without the use of a model, and may be based on size information received directly from a client or a garment database.

Element 440 then involves analyzing the target garment information with the base client size to generate a map of the base client size to the set of target garment sizes. Such an analysis may be performed by a module such as size mapping module 385.

Element 450 then involves generating a first size match communication based on the map of the base client size to the set of target garment sizes, the first size match communication identifying a closest match between the client size information and a first target size of the set of target garment sizes and communicating to the first user system, a first size match communication.

FIG. 5 describes an alternate method for generating a map and a garment match when a size match request explicitly includes information identifying the cross-border nature of the transaction along with a particular garment design. Such a method may occur, in one embodiment, where a client accesses a web page offering to sell a garment from a different region than where the client is located. The size matching method may be used when sizing conventions or descriptions are presented by the web page in a format, size scale, or language that is not understandable to the client.

The embodiment of FIG. 5 shown by method 500 may begin in element 510 with a system receiving, from a client device in a first country, a first size match requests which includes target garment information identifying a particular garment design associated with a second country. The country associations may be based on a location of the computing devices, a language of a user interface associated with the computing devices, a system input or analysis received from a client and a query to a web site, or any other such association. The particular garment design may be a design number, sales number, an image of a garment, or any other such identifying information. The particular garment design may further be associated with a set of target garment sizes. For example, the web page may indicate that the garment is available in small, medium, and large sizes. Such information may not be associated with standardized measurements, sizes, or shapes that are meaningful to the client located in a different country. A garment database of the system, however, may have additional information or records that may be used to generate such a standardized size mapping for the client.

Element 520 then involves determining a base client size. This may be done in one or more of three different ways. The base client size may be determined using a history of one or more garment purchases associated with the client. This information may have been previously gathered by the matching system, or may be provided by the client along with the size match request. The base client size may be determined by analyzing a computer aided design file associated with a client identified garment. For example, the size match request may identify a brand and garment that is a favorite garment of the client, along with a garment size. The matching system may access a garment database to retrieve a CAD file associated with the garment, and may then analyze the CAD file to determine the base client size. In other embodiments, the matching system may access such a CAD file from a third party database, such as a brand manufacturer website, or the CAD file may be provided by the client. Alternatively, the client may provide one or more images of a garment associated with the client, and the matching system may analyze the files to generate a garment model. The garment model may then be used to determine a base client size, since the client has identified the garment as being associated with a preferred or ideal size for the client. In different embodiments, all of these methods may be used, and the results averaged or weighted to determine the final base client size.

Element 530 then involves a similar process for determining a set of target garment sizes. Since the particular garment design is identified by the size match request, the system does not need to search for garments with similar shapes and styles, but merely needs to identify how the available sizes for the particular garment design will relate to the determined base client size. In certain embodiments, specific details related to a set of target garment sizes may already be available in a garment database. If not, the system may determine the set of target garment sizes in one or more of the following ways. The matching system may analyze a history of size purchases associated with the particular garment design made by other clients. If client history information is able to link purchases of both the target garment in a particular size to purchases of a garment similar to one detailed in the size match request from the client, then the system may be able to associate the sizes, even in specific measurements of exact shape and size details are not available. Also, similar to what is described above for the base client size, a CAD file may be identified and analyzed, or a model may be generated from images of the particular garment design.

In element 540, the base client size and the set of target garment sizes are mapped to a standardized size scale. While in certain embodiments, the standardized size scale may involve particular geometric measurements, in other embodiments, the standardized size scale may be interpolated or suggested based on a history of purchases and returns from other clients and system users. In such embodiments, exact geometric models and measurements may not be available for the mapping, and so a relative map may be estimated based on purchases and returns. For example, a second client known to have a same size and body shape as the client may have purchased and returned the particular garments in a given size. This may be used by the system to map that size away from the correct size for the client that initiated the size match request. If a different size was then ordered and not returned, this may be used to map the second not returned size to the size of the client that requested the size match request. The more such data that is in the system, the stronger the confidence in the mapping may be. A size match communication may therefore include a confidence indicator as part of the communication based on the map of the base client size to the set of target garment sizes.

In certain embodiments, a matching system may not provide a recommendation, but may simply present a mapping with a base client size and the set of target garment sizes on the map. This information may then be used by the client to make their own decision regarding which size to order or whether to order the garment at all.

FIG. 6 then describes an alternative embodiment as method 600. Method 600 describes an embodiment where a particular target garment item or target garment type is not provided by the client. Instead, the system uses a set of client style or shape preferences to search for garment designs, and presents a mapping of garment designs to the client.

Method 600 begins with element 610 receiving a first size match request which includes a set of shape and/or style preferences from the client. The size match request also identifies a target region without identify a particular target garment item or target garment type. For example, a tourist from the United States of America visiting Eastern Europe may identify a region including multiple countries for garment matching along with a set of shape and style preferences. Similarly, a European tourist visiting the west coast of the United States may identify a city or particular portion of the country for a size match.

Element 620 involves analyzing client size information from the first size match request to identify a base client size as described above.

Element 630 involves analyzing a garment database to identify a plurality of garments having a threshold similarity to the set of shape and/or style preferences. This analysis may be based on any combination of client history information, CAD files, or garment models described herein. The threshold values may be based on system parameters, on client selections, or on a combination of client preferences and system parameters. In certain embodiments, for example, a history of return information associated with similar searches may be used to determine system confidence values in a recommendation or match, which may be used to adjust different thresholds of size and shape matching. Additional embodiments may also include color and pattern matching associated with such searches. Such size and shape preferences may be based not only on user inputs, but may also be based on garments identified by a client. For example, a client may provide images of 5 different garments with a size match request to identify brands or garments from the target region which match the garments from the images. The system may then analyze the garment database to retrieve additional information about the garments from the images, and then further search the garment database for garments originating from the target region which share size and shape similarities.

In certain embodiments, a client may request only a partial match. For example, a user may provide images of pants, with a request only to match the size and shape of the bottom of the pant leg. Alternatively, a client may provide images of collared shirts, with a request to only match the collar shape and style.

One a set of sufficiently matching garments are identified in element 630, the system may then optionally further analyze the available sizes for the matched garments. A mapping of the target garment sizes to the base client size may then be provided. In alternate embodiments, the matching system may provide a map of style similarities without providing a mapping of size similarities. For example, if a particular collar style is requested, a map of the similarities and differences between the identified target garment collars and the identified collar style may be made.

In element 650, the first size match communication is generated. The match system communicates match information related the requested shape or style information as mapped to the plurality of garments having the threshold similarity to the set of shape or style preferences. In certain embodiments, this may be a list of garments, with a match value identifying how closely each garment matches the requested preferences. This may be, for example, a percentage based match based on a linear or weighted analyses of the physical dimensions of the preference and the garment. This may be a scored non-linear scale based on history information associated with previous purchases. In other embodiments, this may include multiple types of matching scores or information, along with confidence scores relating to the strength or volume of the data that the match is based on.

As described above, certain embodiments include processes for identifying a match between a base client size and one of a plurality of target garment sizes. In certain embodiments, models may be used for a base client size, with boundary detection algorithms used to detect the closest match with one of the sizes of the plurality of target garment sizes. For example, a base client size may include a set of minimum size boundaries, and the closest match may be considered the target garment size from the plurality of target garment sizes that is larger than all minimum size boundaries of a base client size. In other embodiments, other matching algorithms may be used to match a base client size to a target garment size.

Embodiments described above in methods 400, 500, and 600 may be modified in any number of ways. Certain embodiments may include elements processed or performed in different order, in different combinations with repeated elements, or with multiple methods performed together as part of a single process. For example, an additional embodiment may comprise receiving the first user system, a second size match request, wherein the second size match request is associated with the client size information second target garment information. The system may verify the base client size and identify additional target garment information based on the second target garment information and a user response to a first size match communication identifying a closest match between the client size information and a first target size of the set of target garment sizes. The system may thus incorporate feedback from a client's purchases and returns to improve matching. Further, similar feedback from other client's purchases and returns may be used, such that a third size match request may be processed from a second client, and the second client size information and second client target garment information may be used by the system as part of a garment database to improve matching for subsequent size match requests from both the first client, the second client, and other additional different clients.

In various embodiments, size match requests may be particularly associated with a cross border transaction, wherein the client size information is associated with a first country, and wherein the target garment information is associated with a second country which is different than the first country. Other size match requests may identify regions or language areas with sizing and translation issues similar to those described for cross border transactions between countries.

In certain embodiments, system matching processes may involve analyzing the client size information to determine the base client size comprises analyzing garment sizes associated with the history of one or more garment purchases associated with the client and analyzing returned garment sizes associated with the history of one or more garment purchases to identify a preferred size associated with the history of one or more garment purchases and setting the preferred size as the base client size. In other embodiments, this information related to a preferred size may be used as one variable in setting a base client size.

In certain embodiments, as part of mapping cross border transactions or instead of mapping cross border transaction sizing, the mapping may be associated with particular brands instead of particular garments. This may include identifying a plurality of brands associated with the one or more garment purchases, mapping brand sizes for the plurality of brands to a standardized size scale, and identifying the preferred size using the standardized size scale.

Additionally, boundary detection algorithms may also be used as part of processes for generating garment models from images for use in both identifying a base client size and identifying one or more target garments.

One example of a boundary detection algorithm can be to determine the color-range of the background of the image by averaging out pixel values at the boundary (e.g., first row, first column, last row, last column) of the input image. The background color can be determined to be B (i.e., $B_{RED}$, $B_{GREEN}$, $B_{BLUE}$). Additionally, a pre-determined threshold value (t) can be chosen. The threshold value can be set by the user or calculated by the system (e.g., system 100). All pixel values in the received images that are within a range of the background color (i.e., $B_{RED}$+/−t, $B_{GREEN}$+/−t, $B_{BLUE}$+/−t) are interpreted as background pixels, and hence not part of the garment. Having identified each pixel value as either foreground (i.e., part of garment) or background, for each row of pixels, the pixel values where there is a transition between foreground and background can be identified as the contour/garment boundary pixels. Using these boundary pixels, an outline can be used to generate a partial shape of the garment.

In another example of a boundary detection algorithm, for each row of pixels, the intensity (or color value) at each pixel is compared to the intensity (or color value) of the previous pixel. For a pre-determined threshold, once the difference between consecutive pixel values exceeds the threshold, the identified pixels can be classified as boundary pixels. In some instances, the intensity values for the foreground and background can be assigned via the scan line method. The scan line method includes traversing individual pixels and assigning the designation of background to the colors that match the outer edges of the photograph. In another instances, the boundary can be identified (e.g., extracted) using a gradient calculation method. In the gradient calculation method, differences in pixel color and intensity are calculated between adjacent pixels. A boundary can be identified when the differences are above a predetermined threshold value (e.g., sharp difference in pixel color and/or intensity between adjacent pixels). In yet other instances, the boundary can be determined using both the scan line method and the gradient calculation method. Using both methods can allow for a more accurate identification of the boundary.

Generating the partial shapes can include creating a continuous curve using the identified boundary. As mentioned, the identified boundary can be a discrete set of points. The discrete set of points can be a set of vertices associated with pixels that have been identified as boundary points using a boundary detection algorithm. The curve can be created by joining the discrete set of points that are determined to be boundaries of the garment and then running a smoothing function to eliminate outliers. Additionally, the curve can be modified based on a garment template from the garment database. The curve can be smoothed out by eliminating noise (e.g., remove outliers from the data). For example, noise can refer to the artifacts in image acquisition (e.g., lighting, image compression). Hence, the process of noise removal can help create a smooth edge instead of a jagged edge.

Moreover, the precision can be adjusted to accommodate varying levels of desired accuracy of the created digital garment and can be based on computation power. The precision can be automatically adjusted by the system based on the client device (e.g., lower precision for mobile device, higher precision for large screen display). In some instances, the standard error of tolerance is a parameter that can be set. Tolerance can be measured by actual units of distance (e.g., 0.01 inches). Alternatively, tolerance can be measured in number of pixels.

Furthermore, accuracy parameters can be received (e.g., from a user) or determined to help identify the boundary of the garment or a base client size. Accuracy parameters can include, but are not limited to, extracted geometry files, extracted texture files, stitching information files and garment templates as part of a garment database 250.

Optionally, texture and optical properties can be determined from the images (e.g., photographs) as stored in the extracted texture files. The texture information can be used to determine the material properties of the garment and can be used to generate the texture map as part of a garment model. The material properties of the garment can be used for calculating the simulated forces as part of a garment map. Furthermore, the material properties can be matched to the garment template in a garment database in order to determine the type of garment using a texture mapping module that may be part of a size simulation module for creating garment models 253. For example, the system can identify pleats in a garment when every part of the garment is captured in one of the input images. Moreover, the material property can be extracted even if the images of the garment are stretched or sheared. The optical properties can be used during the optional operations of applying a texture map to a garment model. A garment associated with images may then be used to determine a type of garment by comparing the generated first and second partial shapes to a database of reference garment shapes using the garment database.

Figure 7:
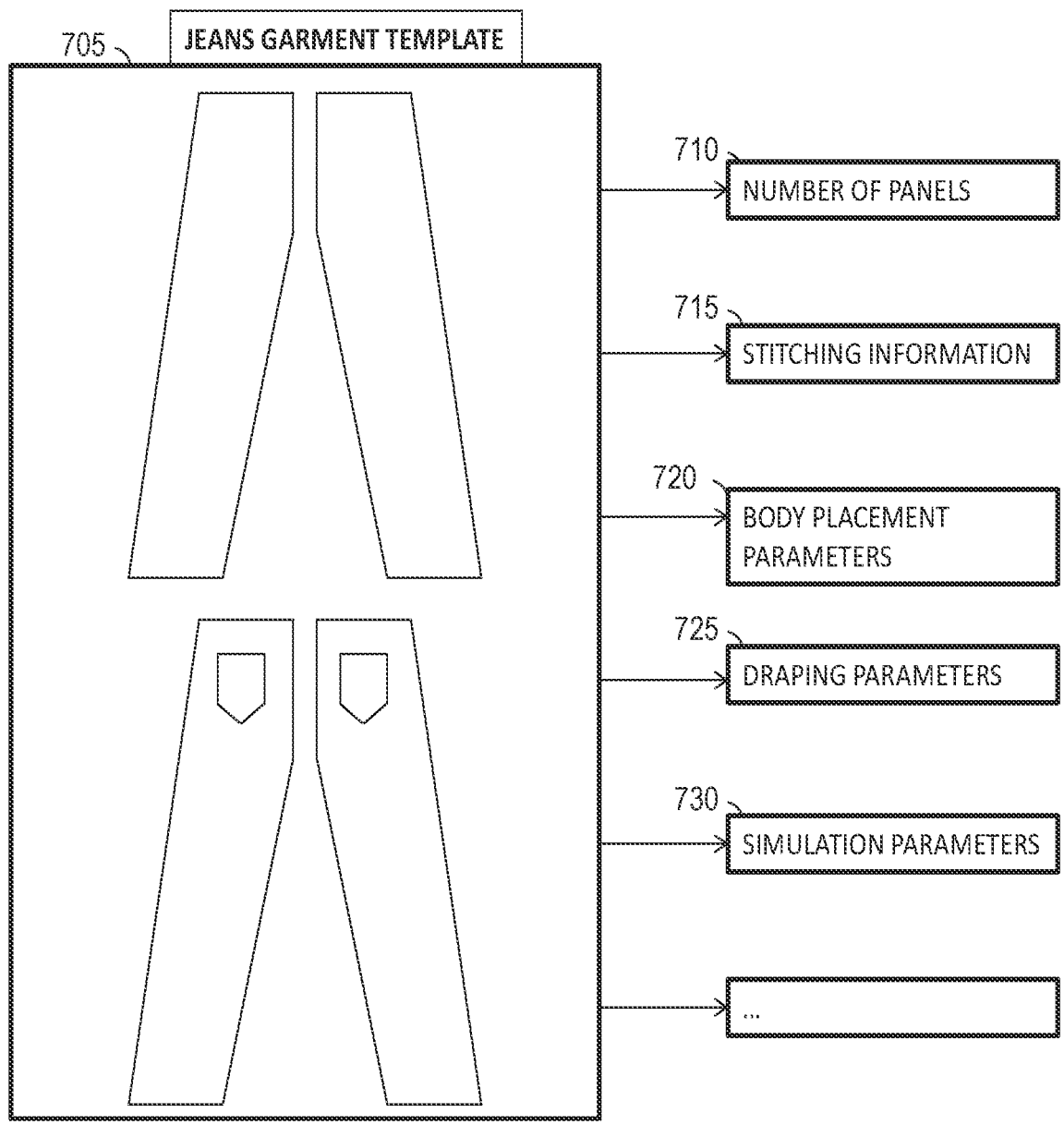
FIG. 7 illustrates examples of garments templates and models in a garment database, in accordance with embodiments of the present disclosure.
Figure 8:
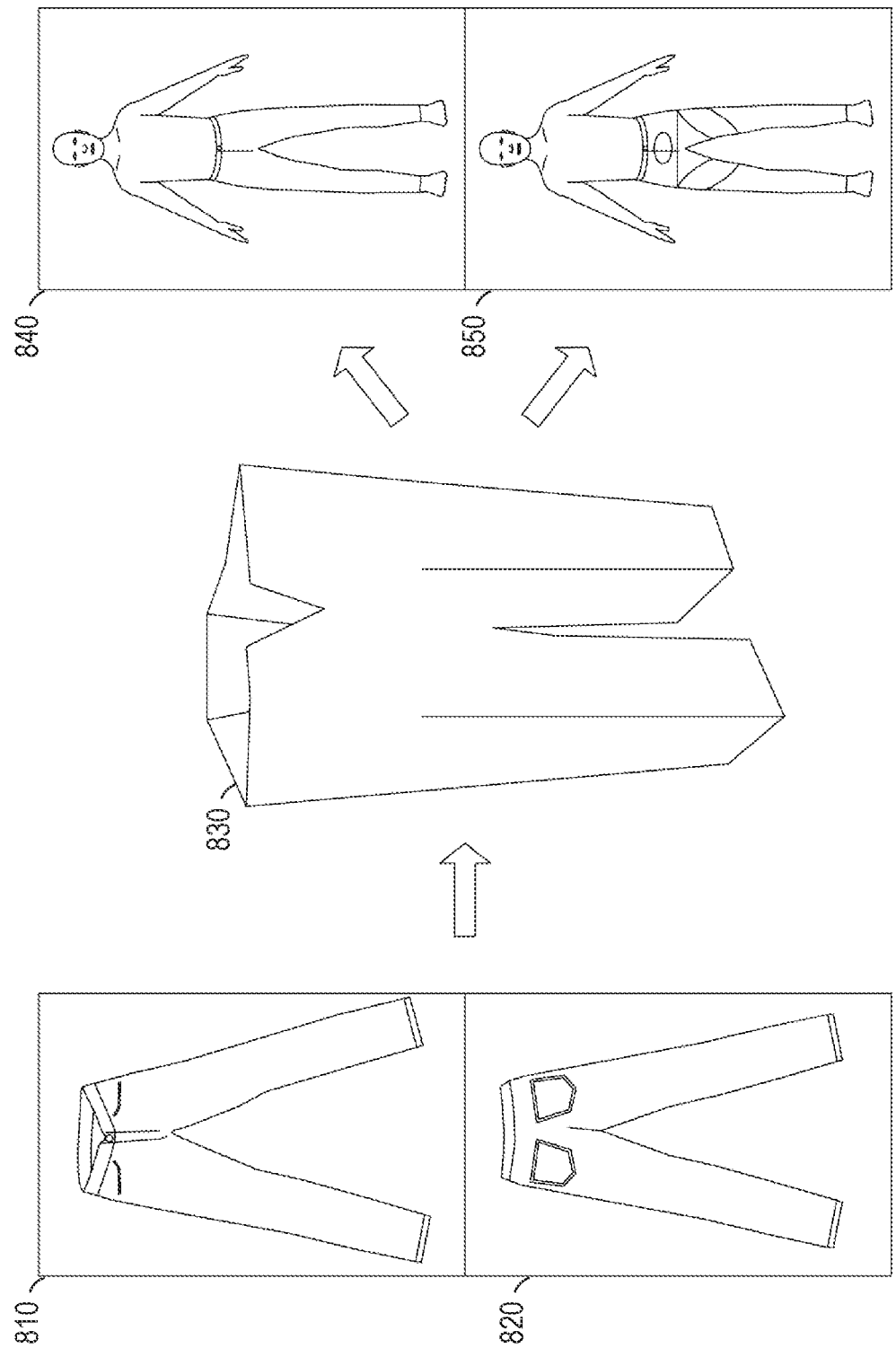
FIG. 8 illustrates examples of garments templates and models in a garment database, in accordance with embodiments of the present disclosure.
Figure 9:
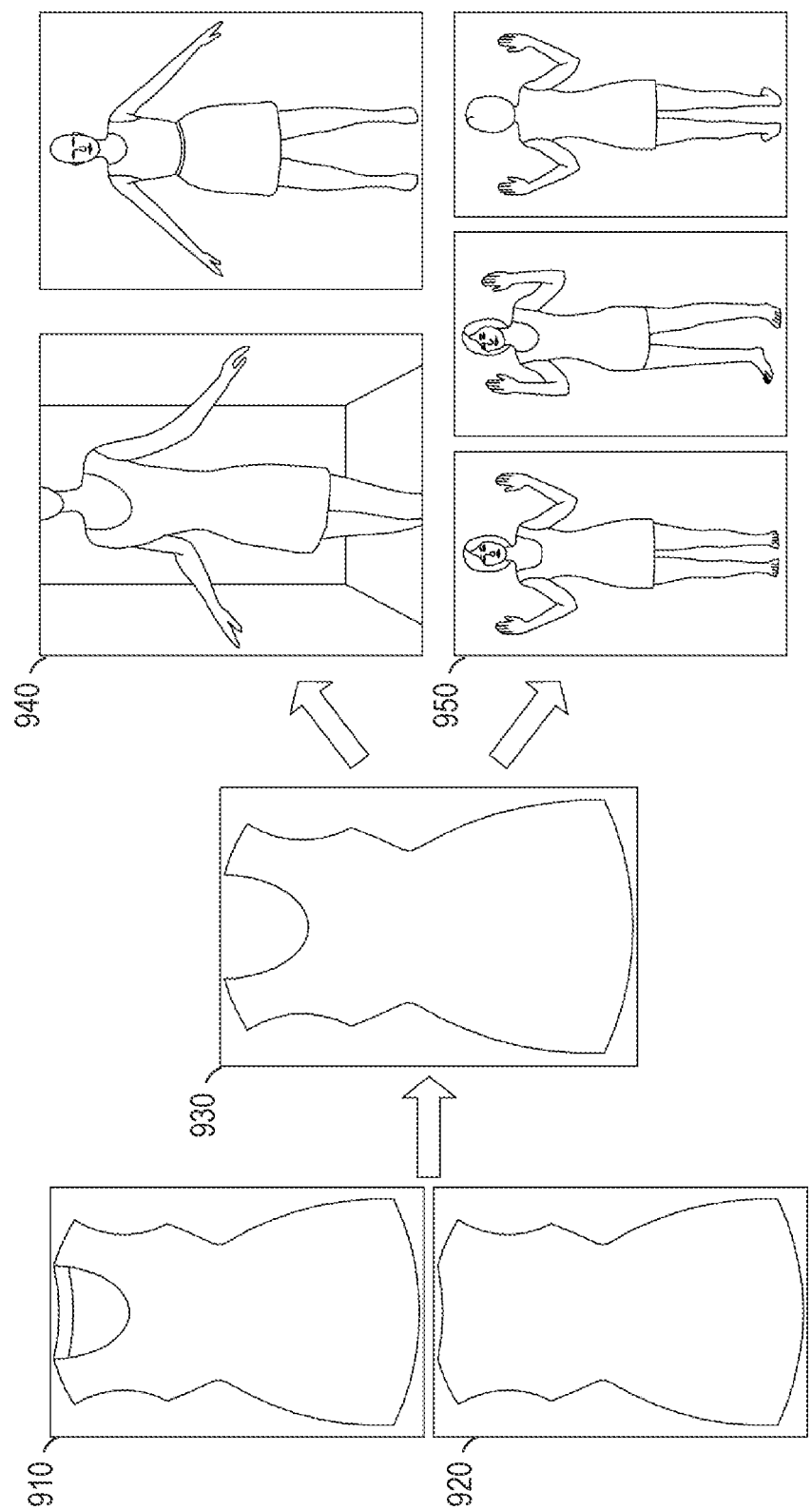
FIG. 9 illustrates examples of garments templates and models in a garment database, in accordance with embodiments of the present disclosure.

FIGS. 7-9 illustrate aspects of garment models and garment model information that may be stored in file system 242 as part of garment models 253. For example, in FIG. 7, the jeans garment template 705 can include information such as the number of panels 710, stitching information 715 of the jeans, body placement parameters 720 of the jeans, draping parameters 725, simulation parameters 730, and other relevant information associated with the jeans garment template. Various parameters may include location parameters within the context of a physical description of aspects of a garment, described within a coordinate system. Parameters may also describe modeled physical characteristics such as elasticity, folding or bending descriptions, fabric resilience and thickness, or other such descriptors of a garment or elements of a garment.

In another example, in FIG. 9, the sleeveless dress garment template can include information such as the number of panels, stitching information of the dress, body placement parameters of the dress, draping parameters, simulation parameters, and other relevant information associated with the sleeveless dress garment template. This information may then be used to create garment models, and to search existing garment models using client size and shape preferences.

For example, as illustrated in FIG. 8, two images (e.g., photographs) of the front of the jeans and the back of the jeans can be sufficient when all parts of the garment are captured in the images. Using the two images, the size simulation module 386 can generate a first partial shape corresponding to the front of the jeans 810 and a second partial shape corresponding to the back of the jeans. Then, the garment model creation process may determine that the received images are images of a pair of jeans by comparing the generated partial shapes to a jeans garment template the garment database 250. Moreover, based on the determination that the garment is a pair of jeans, the system can join the partial shapes to generate a 3-D pair of the digital jeans as part of a garment model of the jeans.

In certain embodiments, a garment database can hold entries for different garments (e.g., jeans garment template, sleeveless dress garment template, blouse garment template, sweater garment template, shirt garment template). In some embodiments, if the shape does not match a previously stored entry in the basic garment database, then algorithms may be needed to provide guidance in sewing the sides together for the particular new garment shape. Alternatively, the intervention can be automated. The shape can then be stored as a new entry into the basic garment database. These templates may be searched along with particular garment models to simplify various elements of the garment size matching processes described herein.

As part of garment modeling, certain embodiments may modify a generated 3-D garment model by adding a second group of vertices to the generated 3-D garment model using the tessellation. Tessellation can include breaking down (e.g., tiling) a garment into many tessellated geometric shape to generate a tessellated garment model. For example, the shirt can be tessellated with triangles (e.g., about 20,000 triangles when triangle edge is around 1 centimeters), and the vertices of the triangles can be the second group of vertices in the generated 3-D garment model. The vertices of the triangles can give location information of certain points in the material. The location information can be an x, y and z position value, and the location position can be independent of color and design of the garment.

Tessellation can be used to determine the location of certain points in the material of the garment. The certain points in the material of the garment can be represented by planar shapes. For example, the interior of the boundary of the garment can be filled with a plurality of similar geometric shapes. The points used for the tessellation can be based on the vertices of the shape. The shapes for the tessellation can be triangles, given that triangles are an efficient way (e.g., less computational power, faster tessellation speed) of representing a tessellated garment.

Furthermore, the points of the tessellated geometric shape can bend outside the shape, but not within. For example, if the tessellated shape is a triangle, different triangles can be folded over other triangles, but a triangle cannot be folded within itself. In other words, the triangle itself remains planar. In such example, the three vertices of the triangle determine the three points. An example tessellation can be an extracted shape (e.g., a shirt shape) being filled with a plurality of triangles, each with edges that can be calibrated (e.g., 1 cm). Thus, each point on the shirt can be approximated or located by reference to the nearest vertex on the most proximate triangle to the location of the determined position. In some embodiments, the triangles are equilateral triangles to maximize efficiency. In some arrangements, tessellation is consistent for each garment and thus, in the example, the same 1 cm edge triangle shape is used for tessellation of all extracted shapes. Alternatively, different tessellation shapes are used for different extracted shapes.

Furthermore, tessellation can refer to the location of points of material and can be independent of the color and design of the garment.

In various embodiments, data of tessellation and boundary can be compatible with single instruction multiple data (SIMD). SIMD can be a type of vector processor that uses the same instruction on multiple elements. SIMD compatibility can ensure that the code is consistent with the hardware. Making the processes SIMD friendly can allow for utilization of the hardware in a more efficient manner because current hardware includes processors or processors with SIMD units. Additionally, the tessellation can be done in parallel (e.g., performing the tessellation using multiple SIMD units in parallel) in order to increase the tessellation speed, and the simulation of the garment under different scenarios.

Optionally, certain embodiments can include an operation for calibration. In such embodiments, first and/or second images of a garment or portions of a garment can include an object (e.g., credit card) with a known size for to calibrate the boundary and size of the garment. In various embodiments, identifying the boundary can include computing shape and size of the garment. In some instances, the calibration object can be placed on the garment, where the calibration object is clearly visible in the photograph but not distinct from the garment itself. A square object may be a better object for calibration because of the straight lines, four equal sides and four equal angles.

Garment modeling can include generating multiple sizes of the same garment by scaling or distorting the 3-D digital garment model. Scaling or distorting the 3-D digital garment model can generate 3-D models that are representative of the family of sizes of a garment typically carried and sold by retailers. Alternatively, scaling or distorting the 3-D digital garment model can generate a specific sized version of the garment. The distortion of the 3-D digital garment model can be uniform for the entire model (i.e., the entire model is grown or shrunk), or specific to individual zones (e.g., specific garment areas) with different distortions (e.g., scale factors) for the individual zones. Additionally, the scaling of dimensions of the garments can be arbitrary (as in the case of creating a custom size), or can be according to specifications. The specifications can be based on grading rules, size charts, actual measurements, and/or digital measurements.

In certain embodiments, a base client size may be used to generate a representative geometry of a client, and a 3-D digital garment model for multiple sizes of the same garment design may be generated in order to model the fit of the garment as part of mapping a set of target garment sizes to a base client size. This may involve use of a cloth engine can take as input tessellation and material properties and can output 3-D models of clothing on client avatars. The cloth engine can move the points around to fit a 3-D body model based on a simulated force (e.g., friction, stitching force). Additionally, based on this modeling, the points are connected via spring models as part of the garment modeling and the spring models can be stretched based on a simulated force (e.g., gravity, material property of garment). The cloth engine can solve a system of equations, given that the equations are all inter-connected. In one example, the system of equations can be based on the spring force on each vertex.

Thus, in certain embodiments, a garment model may be generated by generating a first partial shape of a garment based on the first image and generating a second partial shape of the garment of the garment based on the second image. A type of garment may then be determined by comparing the generated first and second partial shapes to a database of reference garment shapes. The garment model may be initially generated by joining the first partial shape and the second partial shape based on the determined type of garment, the generated three-dimensional garment model including a first group of vertices. The garment model may further be adjusted by tessellating the generated three-dimensional garment model by adding a second group of vertices to the generated three-dimensional garment model. In certain such embodiments where a triangle among the triangles of the tessellated three-dimensional garment model has a minimum angle, the model creation process may be optimized to tessellate the generated three-dimensional garment model by maximizing the minimum angle of the triangle The model may then be used in a variety of fashions, including determining the base client size from the generated three-dimensional garment model, performing a match between an avatar representing a base client size and a plurality of models for target garment sizes, or as searchable garment database information used to identify garments meeting threshold size and shape requirements.

Figure 10:
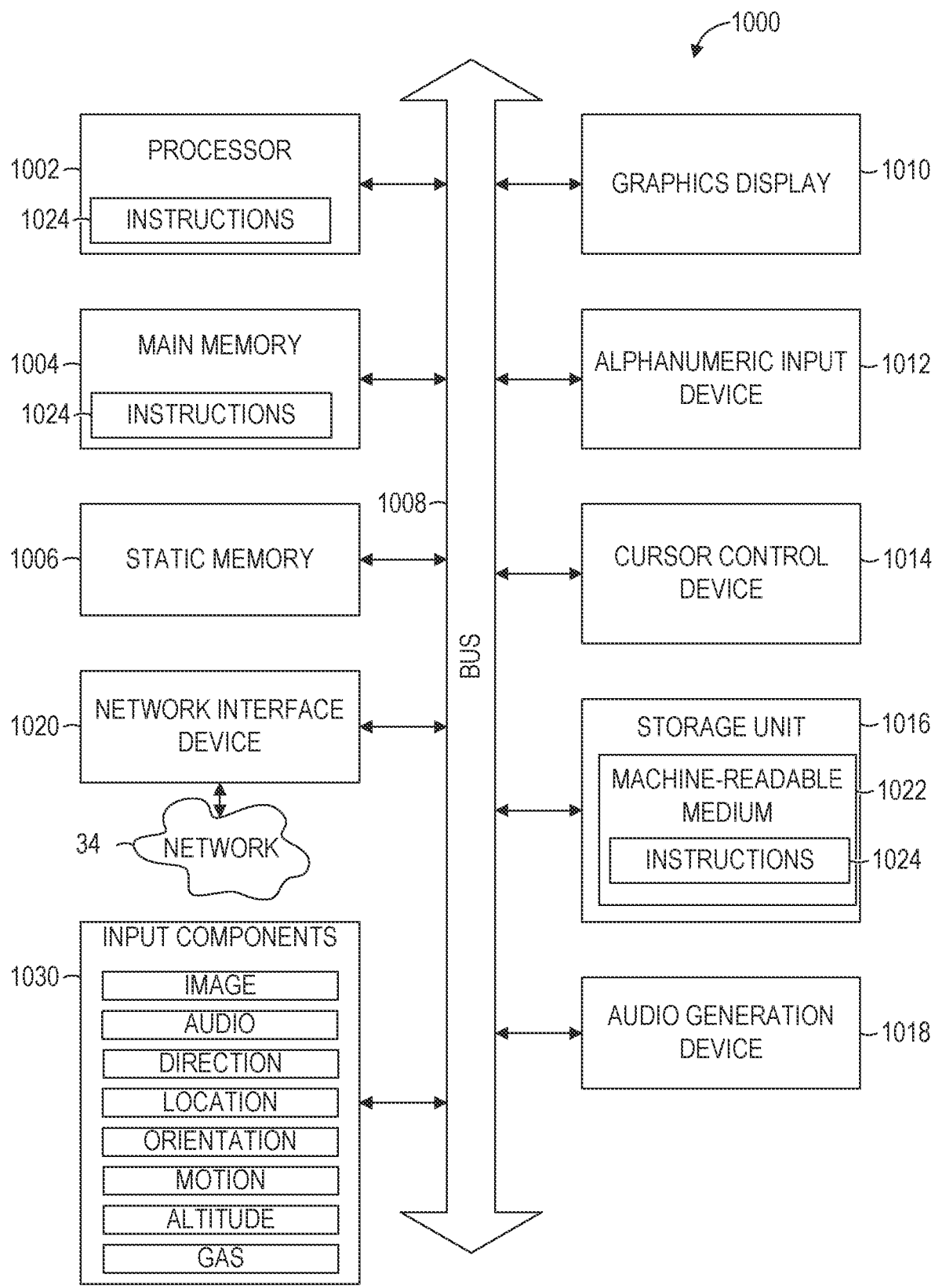
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part. Server 202 can be an example of machine 1000. In various embodiments, a machine such as machine 1000 may be used to implement any computing device referred to herein, including client devices 10, server 202, networking devices that are part of network 34, and any other implementation of a distributed, virtual, or other computing structure which may be used to implement the embodiments described herein.

In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, an audio generation device 1018 (e.g., a sound card, an amplifier, a speaker, a headphone jack, or any suitable combination thereof), and a network interface device 1020.

The storage unit 1016 includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered machine-readable media (e.g., tangible and non-transitory machine-readable media). The instructions 1024 may be transmitted or received over the network 34 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device, such as a smart phone or tablet computer, and have one or more additional input components 1030 (e.g., sensors or gauges). Examples of such input components 1030 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions 1024. The term "machine-readable medium"

shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

It will be understood that, although the terms "first," "second," etc. may be used herein to describe various elements, these elements should not be limited by these terms. These terms are only used to distinguish one element from another.

What is claimed is:

1. A computer-implemented method, comprising:
receiving a size match request associated with a cross border transaction involving a target garment and a website in a first language;
generating, by at least one processor, a map of a base client size to a set of target garment sizes using a standardized size scale and target garment information;
generating, by the at least one processor based on the map, a size match communication indicating a first target garment size having a closest match between the base client size and a target garment size of the set of target garment sizes, the size match communication comprising instructions, in a second language different from the first language, for selecting the target garment in the first target garment size having the closest match from the website in the first language;
causing communication, to a user system, of the size match communication;
receiving, via the user system, a selection of the target garment in the first target garment size having the closest match; and
initiating, in response to the selection, an order of the target garment in the first target garment size having the closest match using the website in the first language.

2. The method of claim 1, wherein:
the base client size is associated with a first country; and
the target garment information is associated with a second country that is different from the first country.

3. The method of claim 1, wherein the base client size is associated with a garment purchase history.

4. The method of claim 3, wherein the base client size is a preferred size determined based on analyzing one or more returned garment sizes associated with the garment purchase history.

5. The method of claim 3, wherein the base client size is determined by:
identifying a brand associated with the garment purchase history;
mapping brand sizes for the brand to the standardized size scale; and
identifying the base client size using the standardized size scale.

6. The method of claim 3, wherein the garment purchase history is generated automatically by a purchase history module operating on a client device recording a history of client purchases.

7. The method of claim 3, wherein the garment purchase history is generated by a user entering a brand and size history for one or more garments.

8. The method of claim 3, wherein the base client size is determined by:
identifying computer-aided design (CAD) files for client garments associated with the garment purchase history; and
determining the base client size by analyzing dimensions of the client garments from the CAD files.

9. The method of claim 1, wherein the base client size is determined by:
generating a first partial shape of a garment based on a first image depicting a first view of the garment;
generating a second partial shape of the garment based on a second image depicting a second view of the garment;
determining a type of garment by comparing the first partial shape and the second partial shape to a database of reference garment shapes;
generating a three-dimensional garment model by joining the first partial shape and the second partial shape based on the determined type of garment, the generated three-dimensional garment model including a first group of vertices; and
determining the base client size from the generated three-dimensional garment model.

10. The method of claim 9, further comprising:
tessellating the generated three-dimensional garment model into triangles, wherein vertices in the triangles correspond to points that are interior to the generated three-dimensional garment model, wherein a triangle among the triangles of the tessellated three-dimensional garment model has a minimum angle.

11. The method of claim 9, further comprising:
determining the base client size using a reference object placed near the garment in the first image.

12. The method of claim 1, wherein:
the set of target garment sizes is associated with a garment database that comprises a set of garment models; and
each garment model of the set of garment models is associated with a plurality of sizes.

13. The method of claim 12, wherein:
the set of garment models comprises one or more garment models for the target garment; and
the one or more garment models for the target garment comprise the set of target garment sizes.

14. The method of claim 13, wherein generating the map of the base client size to the set of target garment sizes comprises analyzing the one or more garment models for the target garment to associate the standardized size scale and the base client size.

15. The method of claim 1, wherein generating the map of the base client size to the set of target garment sizes comprises analyzing one or more computer-aided design (CAD) files associated with the target garment to identify:
the standardized size scale, wherein the standardized size scale is associated with the base client size; and
the set of target garment sizes, wherein the target garment sizes are detailed by the one or more CAD files associated with the target garment.

16. The method of claim 1, wherein generating the map of the base client size to the set of target garment sizes comprises analyzing purchase histories for a plurality of users to:
associate the base client size with a first set of purchase history purchases;
associate the target garment with a second set of purchase history purchases; and
evaluate the first set of purchase history purchases and at least a portion of the second set of purchase history purchases to identify the first target garment size of the set of target garment sizes.

17. The method of claim 1, wherein the target garment information comprises a target country without identifying a particular garment item.

18. The method of claim 1, wherein:
the size match request comprises a set of shape and style preferences; and
the method further comprises:
analyzing a garment database to identify a plurality of garments having a threshold similarity to the set of shape and style preferences to identify the set of target garment sizes; and
translating at least a portion of information associated with the target garment from the first language to the second language.

19. A system comprising:
at least one processor; and
memory storing instructions that, when executed by the at least one processor, cause the system to perform a set of operations, the set of operations comprising:
receiving a size match request associated with a cross border transaction involving a target garment and a website in a first language;
generating a map of a base client size to a set of target garment sizes using a standardized size scale and target garment information;
generating, based on the map, a size match communication indicating a first target garment size having a closest match between the base client size and a target garment size of the set of target garment sizes, the size match communication comprising instructions, in a second language different from the first language, for selecting the target garment in the first target garment size having the closest match from the website in the first language;
causing communication, to a user system, of the size match communication;
receiving, via the user system, a selection of the target garment in the first target garment size having the closest match; and
initiating, in response to the selection, an order of the target garment in the first target garment size having the closest match using the website in the first language.

20. A non-transitory machine-readable storage comprising instructions that, when executed by one or more processors of a machine, cause the machine to perform operations comprising:
receiving a size match request associated with a target garment and a website in a first language;
generating a map of a base client size to a set of target garment sizes using a standardized size scale and target garment information;
generating, based on the map, a size match communication indicating a first target garment size having a closest match between the base client size and a target garment size of the set of target garment sizes, the size match communication comprising instructions, in a second language different from the first language, for selecting the target garment in the first target garment size having the closest match from the website in the first language;
causing communication, to a user system, of the size match communication;
receiving, via the user system, a selection of the target garment in the first target garment size having the closest match; and
initiating, in response to the selection, an order of the target garment in the first target garment size having the closest match using the website in the first language.

21. The non-transitory machine-readable storage of claim 20, wherein:
the base client size is associated with a first country; and
the target garment information is associated with a second country that is different from the first country.

22. The non-transitory machine-readable storage of claim 20, wherein the base client size is associated with a garment purchase history.

23. The non-transitory machine-readable storage of claim 22, wherein the base client size is a preferred size determined based on analyzing one or more returned garment sizes associated with the garment purchase history.

24. The non-transitory machine-readable storage of claim 22, wherein to determine the base client size the instructions further cause the machine to perform operations comprising:
identifying a brand associated with the garment purchase history;
mapping brand sizes for the brand to the standardized size scale; and
identifying the base client size using the standardized size scale.

25. The non-transitory machine-readable storage of claim 22, wherein the garment purchase history is generated automatically by a purchase history module operating on a client device recording a history of client purchases.

26. The non-transitory machine-readable storage of claim 22, wherein the garment purchase history is generated by a user entering a brand and size history for one or more garments.

27. The non-transitory machine-readable storage of claim 22, wherein to determine the base client size the instructions further cause the machine to perform operations comprising:
identifying computer-aided design (CAD) files for client garments associated with the garment purchase history; and determining the base client size by analyzing dimensions of the client garments from the CAD files.

28. The non-transitory machine-readable storage of claim 20, wherein to determine the base client size the instructions further cause the machine to perform operations comprising:
generating a first partial shape of a garment based on a first image depicting a first view of the garment;
generating a second partial shape of the garment based on a second image depicting a second view of the garment;
determining a type of garment by comparing the first partial shape and the second partial shape to a database of reference garment shapes;
generating a three-dimensional garment model by joining the first partial shape and the second partial shape based on the determined type of garment, the generated three-dimensional garment model including a first group of vertices; and
determining the base client size from the generated three-dimensional garment model.

29. The non-transitory machine-readable storage of claim 28, wherein the instructions further cause the machine to perform operations comprising:
tessellating the generated three-dimensional garment model into triangles, wherein vertices in the triangles correspond to points that are interior to the generated three-dimensional garment model, wherein a triangle among the triangles of the tessellated three-dimensional garment model has a minimum angle.

30. The non-transitory machine-readable storage of claim 28, wherein the instructions further cause the machine to perform operations comprising:
determining the base client size using a reference object placed near the garment in the first image.

31. The non-transitory machine-readable storage of claim 20, wherein:
the set of target garment sizes is associated with a garment database that comprises a set of garment models; and
each garment model of the set of garment models is associated with a plurality of sizes.

32. The non-transitory machine-readable storage of claim 31, wherein:
the set of garment models comprises one or more garment models for the target garment; and
the one or more garment models for the target garment comprise the set of target garment sizes.

33. The non-transitory machine-readable storage of claim 32, wherein generating the map of the base client size to the set of target garment sizes comprises analyzing the one or more garment models for the target garment to associate the standardized size scale and the base client size.

34. The non-transitory machine-readable storage of claim 20, wherein to generate the map of the base client size to the set of target garment sizes the instructions further cause the machine to perform operations comprising analyzing one or more computer-aided design (CAD) files associated with the target garment to identify:
the standardized size scale, wherein the standardized size scale is associated with the base client size; and
the set of target garment sizes, wherein the target garment sizes are detailed by the one or more CAD files associated with the target garment.

35. The non-transitory machine-readable storage of claim 20, wherein to generate the map of the base client size to the set of target garment sizes the instructions further cause the machine to perform operations comprising analyzing purchase histories for a plurality of users to:
associate the base client size with a first set of purchase history purchases;
associate the target garment with a second set of purchase history purchases; and
evaluate the first set of purchase history purchases and at least a portion of the second set of purchase history purchases to identify the first target garment size of the set of target garment sizes.

36. The non-transitory machine-readable storage of claim 20, wherein the target garment information comprises a target country without identifying a particular garment item.

37. The non-transitory machine-readable storage of claim 20, wherein:
the size match request comprises a set of shape and style preferences; and
wherein the instructions further cause the machine to perform operations comprising:
analyzing a garment database to identify a plurality of garments having a threshold similarity to the set of shape and style preferences to identify the set of target garment sizes; and
translating at least a portion of information associated with the target garment from the first language to the second language.

* * * * *